United States Patent
Mizutori et al.

(10) Patent No.: US 11,660,783 B2
(45) Date of Patent: *May 30, 2023

(54) FIBER-REINFORCED RESIN MATERIAL MOLDING, METHOD FOR MANUFACTURING FIBER-REINFORCED RESIN MATERIAL MOLDING, AND METHOD FOR MANUFACTURING FIBER-REINFORCED RESIN MATERIAL

(71) Applicant: Mitsubishi Chemical Corporation, Tokyo (JP)

(72) Inventors: Yukihiro Mizutori, Tokyo (JP); Tadao Samejima, Tokyo (JP); Yasushi Watanabe, Tokyo (JP); Junji Kanehagi, Tokyo (JP); Takayuki Kobayashi, Tokyo (JP)

(73) Assignee: Mitsubishi Chemical Corporation, Tokyo (JP)

(*) Notice: Subject to any disclaimer, the term of this patent is extended or adjusted under 35 U.S.C. 154(b) by 188 days.

This patent is subject to a terminal disclaimer.

(21) Appl. No.: 17/108,230

(22) Filed: Dec. 1, 2020

(65) Prior Publication Data
US 2021/0078207 A1  Mar. 18, 2021

Related U.S. Application Data

(63) Continuation of application No. 15/973,919, filed on May 8, 2018, now Pat. No. 10,933,563, which is a
(Continued)

(30) Foreign Application Priority Data

Dec. 24, 2015 (JP) .............................. JP2015-251532
Jan. 19, 2016 (JP) .............................. JP2016-007707

(51) Int. Cl.
*B29B 15/12* (2006.01)
*B29C 70/06* (2006.01)
(Continued)

(52) U.S. Cl.
CPC ............ *B29B 15/122* (2013.01); *B29C 70/06* (2013.01); *B29C 70/12* (2013.01); *B29C 70/504* (2013.01);
(Continued)

(58) Field of Classification Search
CPC ....... B29B 15/122; B29B 15/12; B29C 70/06; B29C 45/0005; B29C 70/12; B29C 70/50;
(Continued)

(56) References Cited

U.S. PATENT DOCUMENTS 10,933,563 B2 * 3/2021 Mizutori .................. C08J 5/042
2009/0104418 A1  4/2009 Ohki et al.
(Continued)

FOREIGN PATENT DOCUMENTS

CN  101243121 A  8/2008
CN  101992566   3/2011
(Continued)

OTHER PUBLICATIONS

Extended European Search Report dated Sep. 22, 2022 in European Patent Application No. 22157709.1, 9 pages.
(Continued)

*Primary Examiner* — Camie S Thompson
(74) *Attorney, Agent, or Firm* — Oblon, McClelland, Maier & Neustadt, L.L.P.

(57) ABSTRACT

Provided is a fiber-reinforced resin material molding in which fluctuations of the dispersion state of the fiber bundle in the molding is small, the generation of a resin pool is suppressed, and fluctuations in physical properties such as tensile strength and modulus of elasticity are suppressed; a
(Continued)

method for manufacturing the same, and a method for manufacturing a fiber-reinforced resin material. Provided is a fiber-reinforced resin material molding comprising: a fiber bundle comprising a plurality of reinforcing fibers; and a matrix resin, wherein a coefficient of variation in fiber content of the reinforcing fibers per unit zone of 0.1 mm square on a cut face along a thickness direction is 40% or less.

11 Claims, 4 Drawing Sheets

Related U.S. Application Data continuation of application No. PCT/JP2016/088188, filed on Dec. 21, 2016.

(51) Int. Cl.

| | | |
|---|---|---|
| B29C 70/50 | (2006.01) | |
| C08J 5/04 | (2006.01) | |
| B29C 70/12 | (2006.01) | |
| B29K 63/00 | (2006.01) | |
| B29K 307/04 | (2006.01) | |

(52) U.S. Cl.
CPC ............... *C08J 5/04* (2013.01); *C08J 5/042* (2013.01); *B29K 2063/00* (2013.01); *B29K 2307/04* (2013.01); *C08J 2363/00* (2013.01)

(58) Field of Classification Search
CPC ............ B29K 2063/00; B29K 2307/04; B29K 2101/12; C08J 5/04; C08J 5/042
USPC ............................................ 428/292.1, 297.4
See application file for complete search history.

(56) References Cited

U.S. PATENT DOCUMENTS

| | | |
|---|---|---|
| 2012/0213997 A1 | 8/2012 | Wang et al. |
| 2014/0155540 A1 | 6/2014 | Imai et al. |
| 2015/0044470 A1 | 2/2015 | Tomioka et al. |
| 2015/0252160 A1 | 9/2015 | Teranishi et al. |
| 2016/0185922 A1 | 6/2016 | Miura |

FOREIGN PATENT DOCUMENTS

| | | |
|---|---|---|
| DE | 1 629 604 A1 | 1/1971 |
| EP | 0 312 993 A2 | 4/1989 |
| EP | 2 090 423 A1 | 8/2009 |
| JP | 58-131028 A | 8/1983 |
| JP | 62-73914 | 4/1987 |
| JP | 1-200914 A | 8/1989 |
| JP | 2-18008 A | 1/1990 |
| JP | 5-83043 B2 | 11/1993 |
| JP | 6-262623 | 9/1994 |
| JP | 9-94826 | 4/1997 |
| JP | 2006-219780 | 8/2006 |
| JP | 2008-027672 A | 2/2008 |
| JP | 2008-254191 | 10/2008 |
| JP | 2009-62474 | 3/2009 |
| JP | 2012-148568 | 8/2012 |
| JP | 2013-6353 | 1/2013 |
| JP | 2013-202890 | 10/2013 |
| JP | 2013-215974 | 10/2013 |
| JP | WO 2013/147257 A1 | 10/2013 |
| JP | 2014-15706 A | 1/2014 |
| JP | 2014-156688 A | 8/2014 |
| JP | 2015-145075 | 8/2015 |
| JP | 2015-166130 A | 9/2015 |
| JP | 2015-183025 | 10/2015 |
| WO | WO 2007/020910 A1 | 2/2007 |
| WO | WO 2014/038633 A1 | 3/2014 |
| WO | WO 2014/129497 A1 | 8/2014 |
| WO | WO 2015/111536 A1 | 7/2015 |
| WO | WO 2016/208731 A1 | 12/2016 |
| WO | WO 2017/006989 A1 | 1/2017 |

OTHER PUBLICATIONS

European Office Action dated Nov. 18, 2021 in European Patent Application No. 16878799.2, 12 pages.
Combined Chinese Office Action and Search Report dated Aug. 10, 2022 in Chinese Patent Application No. 202110511071.8 (with unedited computer generated English translation), 13 pages.
Japanese Office Action dated Jan. 19, 2021 in Japanese Patent Application No. 2018-022546 (with unedited computer-generated English translation), 13 pages.
Office Action dated Mar. 4, 2021 in corresponding Korean Patent Application No. 10-2021-7004099 (with English Translation), 10 pages.
International Search Report dated Feb. 7, 2017 in PCT/JP2016/088188, filed on Dec. 21, 2016 (with English Translation).
Office Action dated Dec. 12, 2017 in Japanese Application 2017-501413 (with English Translation).
Japanese Office Action dated Feb. 26, 2019 in Patent Application No. 2017-501413 (with unedited computer generated English translation).
Partial Supplementary European Search Report dated Apr. 8, 2019 in European Patent Application No. 16878799.2.
Notification dated Jun. 12, 2018 in Japanese Patent Application No. 2017-501413 (with English translation), 16 pages.
Office Action dated Jul. 3, 2018 in Japanese Patent Application No. 2017-501413 (with English translation), 11 pages.
Notification dated Oct. 23, 2018 in Japanese Patent Application No. 2017-501413 (with English translation), 8 pages.
"Latest Application Technology and Market Prospect of SMC", Shimizu Factory Engineering Office, Chemical Division, Takeda Pharmaceutical Company Limited. Sep. 1, 1990, (with English translation), pp. 130-138 with cover pages.
Japanese Office Action dated Jul. 9, 2019 in Patent Application No. 2017-501413 (with English translation), 17 pages.
Japanese Office Action dated Jul. 16, 2019 in Patent Application No. 2017-501413 (with English translation), 6 pages.
Japanese Office Action dated Oct. 1, 2019, in Patent Application No. 2017-501413, 12 pages (with unedited computer generated English translation).
Combined Chinese Office Action and Search Report dated Nov. 11, 2019 in Chinese Patent Application No. 201680075217.6 (with English translation), 24 pages.
Korean Office Action dated Aug. 21, 2019 in Patent Application No. 10-2018-7016548 (with unedited computer generated English translation), 13 pages.
Extended European Search Report dated Sep. 17, 2019 in Patent Application No. 16878799.2, 9 pages.
Korean Office Action dated May 26, 2020 Korean Patent Application No. 10-2020-7014160 (with unedited computer generated English translation), 10 pages.
Office Action as received in the corresponding CN patent application No. 201680075217.6 dated Sep. 4, 2020 w/Machine Generated English Translation, 18 pages.
Office Action dated Feb. 9, 2023, in Chinese Patent Application No. 202110511071.8 (with English-language Translation).

\* cited by examiner

FIBER-REINFORCED RESIN MATERIAL MOLDING, METHOD FOR MANUFACTURING FIBER-REINFORCED RESIN MATERIAL MOLDING, AND METHOD FOR MANUFACTURING FIBER-REINFORCED RESIN MATERIAL

This application is a continuation application of U.S. application Ser. No. 15/973,919 filed May 8, 2018, now U.S. Pat. No. 10,933,563, which is a continuation application of International Application No. PCT/JP2016/088188, filed on Dec. 21, 2016, which claims the benefit of priority of the prior Japanese Patent Application No. 2015-251532 filed in Japan on Dec. 24, 2015 and the prior Japanese Patent Application No. 2016-007707 filed in Japan on Jan. 19, 2016 the entire contents of which are incorporated herein by reference.

TECHNICAL FIELD

The present invention relates to a fiber-reinforced resin material molding, a method for manufacturing a fiber-reinforced resin material molding, and a method for manufacturing a fiber-reinforced resin material.

BACKGROUND ART

A SMC (sheet molding compound) haying a property of easily flowing at the time of molding by a die is widely used as an intermediate material a fiber-reinforced resin material molding having a part haying partially different wall thickness, a rib, a boss and the like. A SMC is a fiber-reinforced resin material obtained by impregnating a sheet-shaped fiber bundle group formed of a plurality of chopped fiber bundles obtained by cutting a long reinforcing fiber, for example, a glass fiber or a carbon fiber into a predetermined length with a thermosetting resin such as an unsaturated polyester resin.

A SMC is manufactured, for example, by the following method. A paste containing a thermosetting resin is coated on a sheet-shaped carrier to be conveyed in one direction to form a band-shaped resin sheet. A long fiber bundle is cut into a predetermined length and scattered on the running resin sheet to form a sheet-shaped fiber bundle group. A resin sheet is further laminated on the sheet-shaped fiber bundle group, and the formed laminate is pressed from both sides to impregnate the sheet-shaped fiber bundle group with the resin, thereby obtaining a SMC.

In the manufacture of a SMC, a relatively inexpensive fiber bundle which has a large number of filaments and is called a large tow is often used for the purpose of lowering the manufacturing cost. The fiber bundle of a large tow is thick, and there is thus a tendency that the gap generated between the fiber bundles when the sheet-shaped fiber bundle group is formed is larger as compared to the case of using a fiber bundle having a small number of filaments and a thin thickness. A resin pool is like to be formed in the gaps in the sheet-shaped fiber bundle group when a SMC is obtained by impregnating the sheet-shaped fiber bundle group with a resin. The mechanical properties deteriorate when such a resin pool is formed in the SMC.

Hence, in the case of using a fiber bundle having a large number of filaments, a method in which the fiber bundle is widened and flattened in the width direction through opening and then cut is widely used (for example, Patent Literature 1 and Patent Literature 2). This decreases the gaps in the sheet-shaped fiber bundle group and suppresses a decrease in the mechanical properties of SMC due to the formation of a resin pool.

However, the area of each fiber bundle when the sheet-shaped fiber bundle group is viewed plan creases when the fiber bundle is opened and flattened, and it is thus difficult to sufficiently impregnate the sheet-shaped fiber bundle group with the resin. Generally, plural pairs of rollers are used for pressing laminate at the time of impregnation. It is conceivable to increase the pressure at the time of pressing by a roller in order to sufficiently impregnate the sheet-shaped fiber bundle group with the resin. However, the backflow that the resin floss back and in the surface layer of the laminate is caused by the pressure acid the impregnation is like to be insufficient when the pressure at the time of pressing by the roller is increased.

Meanwhile, a resin impregnation method in which a laminate of a sheet-shaped fiber bundle and a resin is pressurized by using a roll having a plurality of needle-shaped protrusions on the outer circumferential surface and a roll having a flat outer circumferential surface in order (see Patent Literature 3) has been proposed as a method for sufficiently impregnating a sheet-shaped fiber bundle group with a resin while suppressing the retention of air bubbles in the SMC to be obtained. By this method, the retention of air bubbles in the SMC to be obtained is suppressed as the laminate is pierced with the needle-shaped protrusions and debubbling is thus promoted in the pressing by the roll at the former stage.

Meanwhile, examples of the fiber-reinforced resin material molding obtained by molding from a SMC as described above may include the following molding.

A fiber-reinforced resin material molding (Patent Literature 4) which contains chopped fiber bundle containing from 10,000 to 700,000 reinforcing fibers having a fiber length of from 5 to 100 mm and a matrix resin and in which a ratio (Wm/tm) of the average width Wm to the average thickness tm of the chopped fiber bundle is from 70 to 1,500, an average width Wm is from 2 to 50 mm and an average thickness tm is from 0.01 to 0.1 mm.

CITATION LIST

PATENT LITERATURE

Patent Literature 1: US 2012/0213997 A
Patent Literature 2: JP 2006-219780 A
Patent literature 3: IP 62-73914 A
Patent Literature 4: JP 2009-62474 A

SUMMARY OF THE INVENTION

Problem to be Solved by the Invention

However, there are cases in which fluctuations in physical properties such as tensile strength and modulus of elasticity occur depending on the location in the conventional fiber-reinforced resin material molding as disclosed in Patent Literature 4, and it has been difficult to achieve both the improvement in the above physical properties and a decrease in fluctuations in the physical properties even in the case of employing the method of Patent Literature 3 as the manufacturing method of SMC since backflow of the resin occurs and the impregnation hardly sufficiently proceeds when a sheet-shaped fiber bundle group using a fiber bundle in a state of being opened and flattened is impregnated with a resin.

It is an object of the present invention to provide a fiber-reinforced resin material molding in which fluctuations in physical properties such as tensile strength and modulus of elasticity are suppressed and a manufacturing method thereof.

It is another object of the present invention to provide a method for manufacturing a fiber-reinforced resin material which can provide a fiber-reinforced resin material which contains a sheet-shaped fiber bundle group sufficiently impregnated with a matrix resin and has an excellent mechanical strength even in a case in which the fiber bundle for forming, the sheet-shaped fiber bundle group is opened and flattened and is useful for providing the fiber-reinforced resin material molding described above.

Means for Solving Problem

The present invention has the following configuration.

[1] A fiber-reinforced resin material molding containing a fiber bundle comprising a plurality of reinforcing, fibers and a matrix resin, in which
a coefficient of variation in fiber content of the reinforcing fibers per unit zone of 0.1 mm square on a cut face along a thickness direction of the fiber-reinforced resin material molding is 40% or less.

[2] The fiber-reinforced resin material molding according to [1], in which an average fiber length of the reinforcing fibers is from 5 to 100 mm.

[3] The fiber-reinforced resin material molding according to [1] or [2], in which a direction of a fiber axis of the fiber bundle on a cut face along a plane direction is substantially randomly distributed.

[4] The fiber-reinforced resin material molding according to any one of [1] to [3], in which the coefficient of variation is 10% or more.

[5] The fiber-reinforced resin material molding according to any one of [1] to [4], in which an average value of fiber contents of the reinforcing fibers per unit zone of 0.1 mm square on a cut face along a thickness direction of the fiber-reinforced resin material molding is from 50% to 60%.

[6] The fiber reinforced resin material molding according to any one of [1] to [5], in which a ratio of respective flexural moduluses of elasticity along respective directions of two orthogonal directions in the fiber reinforced resin material molding is from 0.8:1 to 1:0.8 and coefficients of variation in flexural moduluses of elasticity along the respective directions are both from 5 to 15.

[7] The fiber-reinforced resin material molding according to any one of [1] to [6], in which the matrix resin is a thermosetting resin.

[8] A method for manufacturing the fiber-reinforced resin material molding according to any one of [1] to [7], the method including molding the fiber reinforced resin material molding from a sheet-shaped fiber-reinforced resin material in which a matrix resin has penetrated between dispersed fiber bundlesand of which a degree of roughness β determined by the following Equations (1) to (3) is from 0.5 to 4.5 when a diffracted X-ray having a diffraction angle 2 θ of 25.4° is detected by an X-ray diffraction measurement:

[Math. 1]

$$\beta = \int_0^{360} |f(\phi)|d\phi \times \frac{1}{360} = \left(\sum_{i=2}^{N}(|f(\phi_i)| + |f(\phi_{i-1})|) \times d\phi \times \frac{1}{2}\right) \times \frac{1}{360} \quad (1)$$

in Equation (1), $f(\phi_i)$ is a brightness which is represented by the following Equation (2) and obtained by subtracting an average brightness from a brightness ($I(\phi_i)$ at an i-th rotation angle ($\phi_i$) in X-ray diffraction measurement and dφ is a step size in the X-ray diffraction measurement. $I(\phi_i)$ is normalized so that an integrated intensity represented by the following Equation (3) is 10,000,

[Math. 2]

$$f(\phi_i) = I(\phi_i) - \frac{\sum_{i=1}^{N} I(\phi_i)}{N} \quad (2)$$

$$\int_0^{360} I(\phi)d\phi = \sum_{i=2}^{N}(I(\phi_i) + I(\phi_{i-1})) \times d\phi \times \frac{1}{2} = 10000 \quad (3)$$

[9] A method for manufacturing the fiber-reinforced resin material molding according to any one of [1] to [7], the method including molding the fiber-reinforced resin material molding from a sheet-shaped fiber-reinforced resin material in which a matrix resin has penetrated between dispersed fiber bundles and of which a total value of an average value and a standard deviation of a degree of crystal orientation fa with a 0° direction as a reference of the fiber brindle determined by the following Equation (4) is from 0.05 to 0.13 when a diffracted X-ray having a diffraction angle 2 θ of 25.4° is detected by an X-ray diffraction measurement where one of two orthogonal directions along a plane direction is set to the 0° direction and the other is set to a 90° direction:

[Math. 3]

$$f_a = 2a - 1 \quad (4)$$

$$a = \frac{\sum_{i=1}^{N} I(\phi_i)\cos^2\phi_i}{\sum_{i=1}^{N} I(\phi_i)} \quad (5)$$

$$\int_0^{360} I(\phi)d\phi = \sum_{i=2}^{N}(I(\phi_i) + I(\phi_{i-1})) \times d\phi \times \frac{1}{2} = 10000 \quad (6)$$

in Equation (4), a is a coefficient of orientation represented by Equation (5) and $I(\phi_i)$ is a brightness at an i-th rotation angle ($\phi_i$) in the X-ray diffraction measurement and is normalized so that an integrated intensity represented by Equation (6) above is 10,000.

[10] A method for manufacturing a fiber-reinforced resin material for manufacturing the fiber-reinforced resin material molding according to any one of [1] to [7], the method including a first impregnation step using a concavo-convex roll having a roll outer circumferential surface provided with a plurality of convex portions having a planar front end lace formed thereon as a step of pressing a laminate in which a sheet-shaped fiber bundle group composed of a plurality of fiber bundles is sandwiched between a first resin sheet containing a matrix resin and a second resin sheet containing a matrix resin by using a roll to impregnate the sheet-shaped fiber bundle group with the matrix resin.

[11] The method for manufacturing a fiber-reinforced resin material according to [10], including a second impregnation step using a planar roll having a roll outer circumferential surface which is not provided with a concave or a convex as a step of further impregnating the sheet-shaped fiber bundle group with the matrix resin after the first impregnation step.

Effect of the Invention

The fluctuations in physical properties such as tensile strength and modulus of elasticity are suppressed in the fiber-reinforced resin material molding of the present invention, and it is possible to manufacture a fiber-reinforced resin material molding in which fluctuations in physical properties such as tensile strength and modulus of elasticity are suppressed by the method for manufacturing a fiber-reinforced resin material molding of the present invention.

The method for manufacturing a fiber-reinforced resin material of the present invention is useful for providing the fiber-reinforced resin material molding of the present invention and can provide a fiber-reinforced resin material which contains a sheet-shaped fiber bundle group sufficiently impregnated with a matrix resin and has an excellent mechanical strength even in a case in which the fiber bundle for forming the sheet-shaped fiber bundle group is opened and flattened.

MODE(S) FOR CARRYING OUT THE INVENTION

Figure 1:
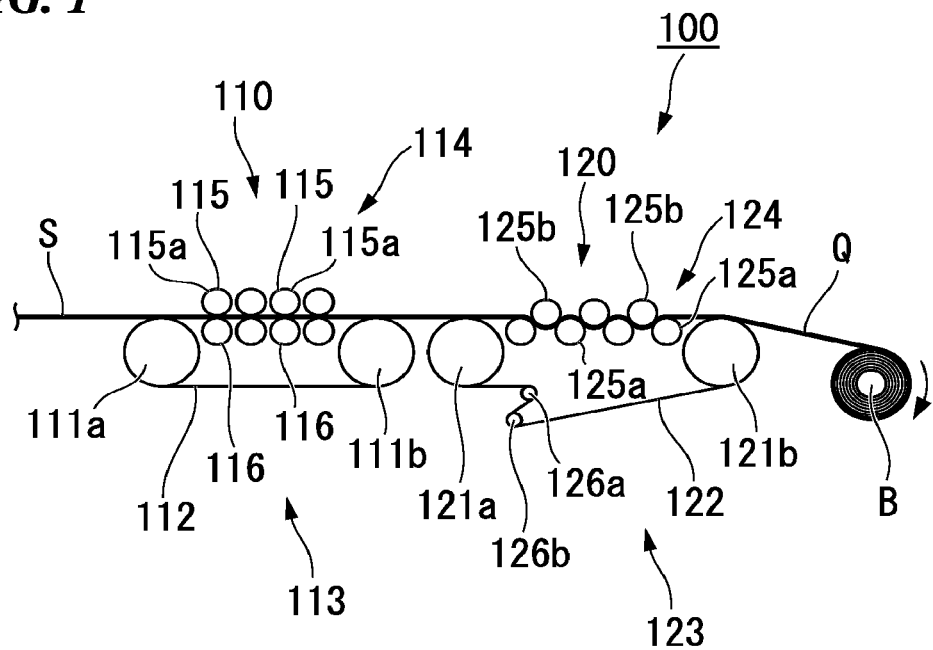
FIG. 1 is a schematic configuration diagram illustrating an example of an impregnation device.

The fiber-reinforced resin material molding of the present invention contains a fiber bundle comprising a plurality of reinforcing fibers and a matrix resin. The fiber-reinforced resin material molding of the present invention is obtained by molding from, for example, a fiber-reinforced resin material (SMC) in which a fiber bundle group composed of a plurality of fiber bundles is impregnated with a matrix resin.

(Fiber Bundle)

In the fiber bundle to be contained in the fiber-reinforced resin material molding of the present invention, a plurality of reinforcing fibers are bundled.

The reinforcing fiber forming the fiber bundle is not particularly limited, and for example, an inorganic fiber, an organic fiber, a metal fiber, or a reinforcing fiber having a hybrid Configuration in which these are combined can be used.

Examples of the inorganic fiber may include a carbon fiber, a graphite fiber, a silicon carbide fiber, an alumina fiber, a tungsten carbide fiber, a boron fiber, and a glass fiber. Examples of the organic fiber may include an aramid fiber, a high density polyethylene fiber, another general nylon fiber, and a polyester fiber. Examples of the metal fiber may include fibers of stainless steel, iron, and the like, and the metal fiber may also be a carbon fiber coated with a metal.

Among these, a carbon fiber is preferable when the mechanical properties such as strength of the fiber-reinforced resin material molding are taken into consideration.

One kind of reinforcing fiber may be used singly or two or more kinds thereof may be used concurrently.

The average fiber length of the reinforcing fibers is preferably from 5 to 100 mm, more preferably from 10 to 75 mm, and still more preferably from 20 to 60 mm.

A fiber-reinforced resin material molding, exhibiting excellent physical properties such as tensile strength and modulus of elasticity is obtained when the average fiber length of the reinforcing fibers is equal to or longer than the lower limit value, and the fiber-reinforced resin material is more likely to flow at the time of molding and the molding is easy when the average fiber length is equal to or shorter than the upper limit value.

Incidentally, the average fiber length of the reinforcing fibers is measured by the following method.

The fiber lengths of 100 fibers randomly extracted are measured to the unit of 1 mm by using a caliper or the like, and the average value thereof is determined.

The number of the reinforcing fibers forming the fiber bundle is preferably from 3,000 to 60,000, more preferably from 3,000 to 24,000, and still more preferably from 3,000 to 15,000.

A fiber-reinforced resin material molding exhibiting excellent physical properties such as tensile strength and modulus of elasticity is likely to be obtained when the number of the reinforcing fibers forming the fiber bundle is equal to or larger than the lower limit value, and the fiber-reinforced resin material is more likely to flow at the time of molding and the molding is easy when the number of the reinforcing fibers is equal to or smaller than the upper limit value.

The average thickness of the fiber bundles is preferably from 0.01 to 0.1 mm, more preferably from 0.02 to 0.09 mm, and still more preferably from 0.025 to 0.07 mm.

It is easy to impregnate the fiber bundle with the matrix resin when the average thickness of the fiber bundles is equal to or greater than the lower limit value, and a fiber-reinforced resin material molding exhibiting excellent physical properties such as tensile strength and modulus of elasticity is likely to be obtained when the average thickness is equal to or smaller than the upper limit value.

Incidentally, the average thickness of the fiber bundles is measured by the following method.

The fiber-reinforced resin material molding is heated by using an electric furnace or the like to decompose the matrix resin, and 10 fiber bundles are randomly selected from the remaining fiber bundles. The thicknesses of the respective 10 fiber bundles are measured by using a caliper at three points of both end portions and the center portion in the fiber axis direction, and the average thickness is determined by averaging all of these measured values.

The average width of the fiber bundles is preferably from 2 to 50 mm, more preferably from 3 to 15 mm, and still more preferably from 3 to 8 mm.

The fiber-reinforced resin material is more likely to flow at the time of molding and the molding is easy when the average width of the fiber bundles is equal to or greater than the lower limit value, and a fiber-reinforced resin material molding exhibiting excellent physical properties such as tensile strength and modulus of elasticity is likely to be obtained when the average width is equal to or smaller than the upper limit value.

Incidentally, the average width of the fiber bundles is measured by the following method.

The widths of the respective 10 fiber bundles obtained in the same manner as in the measurement of average thickness are measured by using, a caliper at three points of both end portions and the center portion in the fiber axis direction, and the average width is determined by averaging all of these measured values.

(Matrix Resin)

As the matrix resin, a thermosetting resin or a thermoplastic resin can be used. As the matrix resin, only a thermosetting resin may be used, only a thermoplastic resin may be used, or both a thermosetting resin and a thermoplastic resin may be used.

A thermosetting resin is preferable as the matrix resin in the case of manufacturing the fiber-reinforced rem material molding of the present invention from a SMC.

A thermoplastic resin is preferable as the matrix resin in the case of manufacturing the fiber-reinforced resin material molding of the present from a stampable sheet.

The thermosetting resin is not particularly limited, and examples thereof may include an epoxy resin, a phenol resin, an unsaturated polyester resin, a vinyl ester resin, a phenoxy resin, an alkyd resin, a urethane resin, a urea resin, a melamine resin, a maleimide resin, and a cyanate resin.

One kind of thermosetting resin may be used singly or two or more kinds thereof may be used concurrently.

Examples of the thermoplastic resin may include a polyolefin-based resin, a polyamide-based resin, a polyester-based resin, a polyphenylene sulfide resin, a polyether ketone resin, a polyether sulfone resin, and an aromatic polyamide resin.

One kind of thermoplastic resin may be used singly or two or more kinds thereof may be used concurrently.

(Fiber Content and Coefficient of Variation in Fiber Content)

A coefficient of variation in a fiber content of a reinforcing fibers per unit zone of 0.1 mm square on a cut face along a thickness direction (hereinafter also referred to as the "coefficient of variation Q") is 40% or less in the fiber-reinforced resin material molding of the present invention.

Here, the thickness direction refers to the direction in which the fiber bundle is laminated in the thickness direction of the fiber-reinforced resin material molding of the present invention.

When the coefficient of variation Q is 40% or less, fluctuations in physical properties such as tensile strength and modulus of elasticity depending on the location in the fiber-reinforced resin material molding are suppressed as the respective fiber bundles are uniformly dispersed in the fiber-reinforced resin material molding and the formation of resin pool is suppressed.

Incidentally, the coefficient of variation Q means a value obtained by cutting the fiber-reinforced resin material molding along the thickness direction, measuring the fiber content of the reinforcing fiber per unit zone of 0.1 mm square at 2000 points on the cut face, calculating the standard deviation and the average value (hereinafter referred to as the "average value P"), and dividing the standard deviation by the average value P.

The upper limit value of the coefficient of variation Q in the fiber-reinforced resin material molding of the present invention is 40%, preferably 35%, and more preferably 30%.

A fiber-reinforced resin material molding in which fluctuations in physical properties such as tensile strength and modulus of elasticity are suppressed is obtained when the coefficient of variation Q is equal to or smaller than the upper limit value.

The coefficient of variation Q is affected not only by the dispersion state of the fiber bundle in the fiber-reinforced resin material molding but also by the fiber axis direction of each fiber bundle.

Specifically, for example, in the case of a fiber bundle having a circular cross-sectional shape, the cross-sectional shape of the fiber bundle on the cut face is a circular shape when the angle of the cut face with respect to the fiber axis direction of the fiber bundle is 90°. Meanwhile, the cross-sectional shape of the fiber bundle on the cut face is an elliptical shape when the angle of the cut face with respect to the fiber axis direction of the fiber bundle is smaller than 90°. In this manner, the proportion occupied by the cross section of the fiber bundle changes as the cross-sectional shape of the fiber bundle per each unit zone is changed when the fiber axis direction of each fiber bundle is changed, and the coefficient of variation Q is thus affected by the fiber axis direction of each fiber bundle.

It indicates that the respective fiber bundles are more uniformly dispersed in the fiber-reinforced resin material molding as the coefficient of variation Q is smaller. However, it is in a state that the change in the cross-sectional shape of the fiber bundle per each unit zone is smaller, that is, the fiber axis directions of the respective fiber bundles are aligned in the fiber-reinforced resin material molding as the coefficient of variation Q approaches zero.

In order to suppress fluctuations in the physical properties of the fiber-reinforced resin material molding, it is preferable that the fiber axis directions of the respective fiber bundles are random. For this reason, the lower limit value of the coefficient of variation Q is preferably 10%, preferably 12%, and more preferably 15%.

Fluctuations in the physical properties of the fiber-reinforced resin material molding are smaller and the isotropy thereof is excellent when the coefficient of variation Q is equal to or larger than the lower limit value.

In other words, the coefficient of variation Q in the fiber-reinforced resin material molding of the present invention is preferably from 10% to 40%, more preferably from 12% to 35%, and still more preferably from 15% to 30%.

The average value P in the fiber-reinforced resin material molding of the present invention is preferably from 50% to 60% and more preferably from 50% to 58%.

Fluctuations in the fiber content per each unit zone are likely to be suppressed when the average value P is within the above range, and fluctuations in the physical properties of the fiber-reinforced resin material molding are thus smaller. A fiber-reinforced resin material molding having a high modulus of elasticity is likely to be obtained when the average value P is equal to or larger than the lower limit value, and impregnation of the fiber bundle group formed of a plurality of fiber bundles with the matrix resin is easier when the average value P is equal to or smaller than the upper limit value, and the manufacture of a fiber-reinforced resin material is easier.

The average value P and coefficient of variation Q in the fiber-reinforced resin material molding can be adjusted by adjusting the fiber content in the fiber-reinforced resin material to be used in the manufacture of the fiber-reinforced resin material molding.

For example, it is possible to increase the average value P in the fiber-reinforced resin material molding by increasing the fiber content in the fiber-reinforced resin material. In addition, it is possible to decrease the coefficient of variation Q in the fiber-reinforced resin material molding by uniformly dispersing the fiber bundles in the fiber-reinforced resin material, suppressing the generation of a resin pool, and thus decreasing fluctuations in the fiber content.

In other words, in the fiber-reinforced resin material molding of the present invention, it is preferable that the direction of the fiber axis of the fiber bundle on the cut face along the plane direction thereof is substantially randomly distributed.

Here, the plane direction refers to the XY-axis direction in a case in which the thickness direction is taken as the Z-axis direction or the direction of a plane orthogonal to the thickness direction.

In addition, "to be substantially randomly distributed" means that the length of the long axis of the cross section of the fiber bundle on the cut face along the plane direction is in a random state.

In the fiber-reinforced resin material molding of the present invention, it is preferable that a ratio between flexural moduluses of elasticity (unit: GPa) along the respective directions of two orthogonal directions (hereinafter also referred to as the "ratio R") is from 0.8:1 to 1:0.8.

In addition, in the fiber-reinforced resin material molding of the present invention, it is preferable that the coefficients or variation in the respective flexural moduluses of elasticity along the respective directions of two orthogonal directions are all from 5% to 15%.

The ratio R is a value indicating the uniformity of the orientation directions of the fiber bundles in the molding. The range of the ratio R is preferably from 0.8:1 to 1:0.8, more preferably from 0.9:1 to 1:0.9, and still more preferably from 0.95:1 to 1:0.95.

The anisotropy of the physical properties of the molding is sufficiently low and there is no practical problem when the ratio R is within the above range.

The coefficients of variation in the respective flexural moduluses of elasticity along the respective directions of two orthogonal directions are preferably from 5% to 15%, more preferably from 5% to 12%, and still more preferably from 7% to 9%.

When the coefficients of variation in the respective flexural moduluses of elasticity along the respective directions of two orthogonal directions are equal to or larger than the lower limit value, the uniformity of orientations of the fiber bundles is not too high, it is possible to suppress deterioration in moldability due to impaired flowability of the matrix resin when molding the fiber-reinforced resin material molding from a SMC or a stampable sheet, it is also not required to excessively lower the speed of the fiber-reinforced resin material production line, and sufficient productivity can be secured. The fluctuations (CV value) in the physical properties between parts in various directions in the molding are sufficiently small when the coefficients of variation in the respective flexural moduluses of elasticity along the respective directions of two orthogonal directions are equal or smaller than the upper limit value.

It is preferable that the fiber-reinforced resin material molding, of the present invention is one that is manufactured by molding from a sheet-shaped fiber-reinforced resin material in which a matrix resin has penetrated between dispersed fiber bundles and of which a degree of roughness $\beta$ determined by the following Equations (1) to (3) is from 0.5 to 4.5 when a diffracted X-ray having a diffraction angle $2\theta$ of 25.4° is detected by an X-ray diffraction measurement.

Incidentally, this detection of diffracted X-rays utilizes the fact that the orientation of the graphite crystal inside the fiber-reinforced resin material is regarded as the orientation of the fiber since the graphite crystal is oriented in the fiber axis direction in a carbon fiber, and the diffracted X-ray having a diffraction angle $2\theta$ of 25.4° is derived from the (002) plane of the graphite crystal.

[Math. 4]

$$\beta = \int_0^{360} |f(\phi)| d\phi \times \frac{1}{360} = \left( \sum_{i=2}^{N} (|f(\phi_i)| + |f(\phi_{i-1})|) \times d\phi \times \frac{1}{2} \right) \times \frac{1}{360} \quad (1)$$

In Equation (1), $f(\phi_i)$ is a brightness which is represented by the following Equation (2) and obtained by subtracting the average brightness from a brightness ($I(\phi_i)$) at the i-th rotation angle ($\phi_i$) in the X-ray diffraction measurement and is a step size in the X-ray diffraction measurement. $I(\phi_i)$ is normalized so that the integrated intensity represented by the following Equation (3) is 10,000.

[Math. 5]

$$f(\phi_i) = I(\phi_i) - \frac{\sum_{i=1}^{N} I(\phi_i)}{N} \quad (2)$$

$$\int_0^{360} I(\phi) d\phi = \sum_{i=2}^{N} (I(\phi_i) + I(\phi_{i-1})) \times d\phi \times \frac{1}{2} = 10000 \quad (3)$$

The degree of roughness $\beta$ is a value determined from a profile derived from the fiber orientation in the X-ray diffraction measurement of the fiber-reinforced resin material, and it is measured by the following method.

From a range of 300 mm in length×300 mm in width of a sheet-shaped fiber-reinforced resin material in which two pieces of samples obtained by cutting a fiber-reinforced resin material continuing in the longitudinal direction in a width direction are laminated so that the longitudinal directions thereof are the same, 25 pieces of specimens of 15 mm in length×15 mm in width are cut out at equal intervals (N=25). By using an X-ray device, the specimen is rotated around the thickness direction thereof as the axis while being irradiated with X-rays by a transmission method, a diffracted X-ray is captured by using a detector disposed at a diffraction angle $2\theta=25.4°$, and the brightness ($I(\phi_i)$) at the i-th rotation angle ($\phi_i$) is measured provided that $I(\phi_i)$ is normalized so that the integrated intensity represented by Equation (3) is 10,000.

Subsequently, the brightness $f(\phi_i)$ obtained by subtracting the average brightness from the brightness ($I(\phi_i)$) is defined as represented by Equation (2), the degrees of roughness for the respective 25 specimens are determined by Equation (1) derived using the brightness $f(\phi_i)$, and the average value thereof is taken as the degree of roughness $\beta$.

It indicates that disturbance in the orientation of the fiber bundle decreases as the degree of roughness $\beta$ approaches zero.

When the degree of roughness β is 0.5 or more, the uniformity of orientations of the fiber bundles is not too high, it is possible to suppress deterioration in moldability due to impaired flowability of the matrix resin when molding the fiber-reinforced resin material molding from a SMC or a stampable sheet, it is also not required to excessively lower the speed of the fiber-reinforced resin material production line, and sufficient productivity can be secured. The degree of roughness β is preferably 1.0 or more, more preferably 1.5 or more, still more preferably 2.0 or more, and particularly preferably 2.5 or more.

When the degree of roughness β is 4.5 or less, it is possible to prevent an anisotropy of the physical properties (for example, the difference between the flexural moduluses of elasticity in the longitudinal direction and the width direction) in various parts of the molded article obtained by molding the sheet-shaped fiber-reinforced resin material from becoming too high. The degree of roughness β is preferably 4.0 or less and more preferably 3.5 or less.

In other words, in the sheet-shaped fiber-reinforced resin material to be used in the method for manufacturing a fiber-reinforced resin material molding of the present invention, has a degree of roughness β of preferably from 0.5 to 4.5, more preferably from 1.0 to 4.0, still more preferably from 1.5 to 4.0, still more preferably from 2.0 to 3.5, and particularly preferably from 2.5 to 3.5.

It is preferable that the fiber-reinforced resin material molding of the present invention is one that is manufactured by molding from a sheet-shaped fiber-reinforced resin material in which a matrix resin has penetrated between dispersed fiber bundlesand of which a total value of an average value and a standard deviation of a degree of crystal orientation fa with a 0° direction as a reference of the fiber bundle determined by the following Equation (4) and taking the 0° direction as a reference is from 0.05 to 0.13, when a diffracted X-rays having a diffraction angle 2 θ of 25.4° is detected by an X-ray diffraction measurement where one of two orthogonal directions along a plane direction is set to the 0° direction and the other is set to a 90° direction

[Math. 6]

$$f_a = 2a - 1 \quad (4)$$

$$a = \frac{\sum_{i=1}^{N} I(\phi_i)\cos^2\phi_i}{\sum_{i=1}^{N} I(\phi_i)} \quad (5)$$

$$\int_0^{360} I(\phi)d\phi = \sum_{i=2}^{N} (I(\phi_i) + I(\phi_{i-1})) \times d\phi \times \frac{1}{2} = 10000 \quad (6)$$

In Equation (4), a is a coefficient of orientation represented by Equation (5) and $I(\phi_i)$ is a brightness at the i-th rotation angle ($\phi_i$) in the X-ray diffraction measurement and is normalized so that the integrated intensity represented by Equation (6) above is 10,000.

The degree of crystal orientation fa is a value determined from the degree of crystal orientation calculated from a diffraction image generated by irradiating the fiber-reinforced resin material with X-rays, and it is measured by the following method.

In the same manner as the method for cutting the specimen used in the method for measuring the degree of roughness β, 25 pieces of specimens are cut out from the sheet-shaped fiber-reinforced resin material (N=25), a diffracted X-ray having a diffraction angle 2 θ=25.4° is captured by using an X-ray device, and the brightness ($I(\phi_i)$) at the i-th rotation angle ($\phi_i$) is measured provided that $I(\phi_i)$ is normalized so that the integrated intensity represented by Equation (6) is 10,000. Subsequently, the coefficient of orientation a for the respective 25 specimens is determined by Equation (5) using the $I(\phi_i)$ thus measured. Furthermore, the degree of crystal orientation fa is determined for the respective 25 specimens by Equation (4) using the coefficient of orientation a thus obtained, and the average value and standard deviation thereof are calculated.

When the total value of the average value and standard deviation of the degree of crystal orientation fa is 0.05 or more, the uniformity of orientations of the fiber bundles is not too high, it is possible to suppress deterioration in moldability due to impaired flowability of the matrix resin when molding the fiber-reinforced resin material molding from a SMC or a stampable sheet is it is also not required to excessively lower the speed of the fiber-reinforced resin material production line, and sufficient productivity can be secured. The total value of the average value and standard deviation of the degree of crystal orientation fa is preferably 0.06 or more and more preferably 0.08 or more.

When the total value of the average value and standard deviation of the degree of crystal orientation fa is 0.13 or less, it is possible prevent that the fluctuations (CV value) in the physical properties between various parts in the longitudinal direction and width direction of the molded article obtained by molding from the sheet-shaped fiber-reinforced resin material from becoming too high. The total value of the average value and standard deviation of the degree of crystal orientation fa is preferably 0.12 or less and more preferably 0.11 or less.

In other words, in the sheet-shaped fiber-reinforced resin material to be used in the method for manufacturing a fiber-reinforced resin material molding of the present invention, the total value of the average value and standard deviation of the degree of crystal orientation fa is preferably from 0.05 to 0.13, more preferably from 0.06 to 0.12, and still more preferably from 0.08 to 0.11.

(Method 1 for Manufacturing Fiber-Reinforced Resin Material)

An aspect of the method for manufacturing a fiber-reinforced resin material is not particularly limited, and examples thereof may include a method which includes
- an opening step of widening a long fiber bundle in the width direction through opening and, if necessary, dividing the fiber bundle in the width direction through dividing,
- a scattering step of continuously cutting the fiber bundle after the opening step to a fiber length of from 5 to 100 mm and scattering a plurality of cut fiber bundles on a first resin sheet containing a matrix resin in a sheet shape to form a sheet-shaped fiber bundle group, and
- a lamination and impregnation step of laminating and pressing the sheet-shaped fiber bundle group and a second resin sheet containing a matrix resin together and impregnating the sheet-shaped fiber bundle group with the matrix resin to obtain a fiber-reinforced resin material.

<Opening Step>

Opening of the fiber bundle in the opening step can be conducted by using, for example, a plurality of opening bars.

Specifically, for example, the respective opening bars are disposed to be parallel to each other and long fiber bundles unwound from the bobbin are run so as to pass the above and below the opening bars in a zigzag manner in order. By this, the fiber bundle is widened in the width direction through heating, scraping, shaking, and the like caused by the respective opening bars.

The thickness of the fiber bundle after the opening step is preferably from 0.01 to 0.1 mm. The width of the fiber bundle after the opening step is preferably from 3 to 100 mm.

A fiber-reinforced resin material molding having a coefficient of variation Q within the above range is likely to be obtained when the thickness and width of the fiber bundle after the opening step are within the above ranges.

In addition, dividing of the fiber bundle, which is conducted if necessary, can be conducted by using to rotary blade continuously provided with a plurality of cutting teeth side by side in the circumferential direction. Specifically, for example, as plurality of rotary blades are disposed at a predetermined interval in the width direction of the running fiber bundle, and the fiber bundle is allowed to pass while rotating the rotary blades. By this, the fiber bundle is intermittently pierced with a plurality of cutting teeth to be divided in the width direction. However, the fiber bundle after being divided by this method is not in a state of being completely divided but is in a state of being partially undivided (connected state).

<Scattering Step>

The scattering step can be conducted, for example, as follows.

A first resin sheet is formed by applying a paste containing a matrix resin on a long first carrier sheet to be conveyed in one direction in a predetermined thickness, and the first carrier sheet is conveyed to run the first resin sheet. Thereafter, a fiber bundle after the opening step is supplied to a cutting machine installed above the running first resin sheet and continuously cut to a fiber length of, for example, from 5 to 100 mm. A plurality of fiber bundles thus cut are scattered on the first resin sheet in a sheet shape by being dropped, thereby forming a sheet-shaped fiber bundle group.

In the scattering step, it is preferable to dispose a plurality of inclined comb teeth (rods) between the running first resin sheet and the cutting machine. Among the fiber bundles which are cut by the cutting machine and dropped, the fiber bundles which are come into contact with the inclined comb teeth are likely to collapse in a direction different from the running direction of the first resin sheet. By this, the dispersed states of the respective fiber bundles in the sheet-shaped fiber bundle group are uniform, the fiber axis directions are likely to be in a random state, and thus the fluctuation in the fiber content an the fiber-reinforced resin material is suppressed. As a result, a fiber-reinforced resin material molding having a coefficient of variation Q within the above range is likely to be obtained.

The height of each inclined comb tooth from the first resin sheet can be appropriately set. The cross-sectional shape of the inclined comb tooth is not particularly limited, examples thereof may include a circular shape, a rectangular shape, and a polygonal shape, and a circular shape is preferable. The diameter of each inclined comb tooth can be set to, for example, about from 0.1 to 10 mm.

The interval of adjacent inclined comb teeth in a plan view is preferably from 0.9 to 1.6 times the average fiber length of the fiber bundle cut by a cutting machine.

The fiber bundles are less likely to be deposited between the inclined comb teeth when the interval of adjacent inclined comb teeth in a plan view is equal to or larger than the lower limit value, and a sufficient proportion of the fiber bundles comes into contact with the inclined comb teeth when the interval is equal to or smaller than the upper limit value and thus a sheet-shaped fiber bundle group having random fiber orientation is likely to be formed.

The inclination angle of the inclined comb tooth with respect to the horizontal direction is preferably greater than 0° and 40° or smaller.

The inclined comb tooth may be vibrated.

In this case, the direction in which the inclined comb tooth is vibrated may be any direction of a length direction, a width direction, or a height direction. The inclined comb tooth may be vibrated in a plurality of directions.

The fiber orientation state of the fiber bundle in the sheet-shaped fiber bundle group is also affected by the running speed of the first resin sheet, namely, the line speed. Specifically, the fiber direction of each fiber bundle is aligned in the running direction of the first resin sheet since the first resin sheet tinning even after the front end of the cut fiber bundle has landed on the first resin sheet. As the line speed is faster, the fiber bundle is likely to be pulled in the running direction of the first resin sheet before the fiber bundle collapses in the direction perpendicular to the running direction of the first resin sheet after landed, and thus the orientation of the fiber bundles in the running direction of the first resin sheet is remarkable. For this reason, it is preferable to adjust the fiber orientation state of each fiber bundle in the sheet-shaped fiber bundle group by controlling the line speed.

Specifically, the line speed is preferably from 0.5 to 5 m/min. This makes it easy to obtain a fiber-reinforced resin material molding in which fluctuations in physical properties are suppressed.

<Lamination and Impregnation Step>

The lamination and impregnation step can be conducted, for example, as follows.

A paste containing a matrix resin is applied on at long second carrier sheet to be conveyed above the first carrier sheet in a direction opposite to the conveyance direction of the first carrier sheet in a predetermined thickness to form a second resin sheet. Thereafter, the conveyance direction of the second carrier sheet on which the second resin sheet is formed is reversed so as to be the same as the conveyance direction of the first carrier sheet to laminate the second resin sheet on the sheet-shaped fiber bundle group. Subsequently, the laminate of the first resin sheet, the sheet-shaped fiber bundle group, and the second resin sheet is pressed from both sides by allowing the laminate to pass between at least a pair of rolls to impregnate the sheet-shaped fiber bundle group with the matrix resin, thereby obtaining a sheet-shaped fiber-reinforced resin material. In this case, the fiber-reinforced resin material is obtained in a state of being sandwiched between the first carrier sheet and the second carrier sheet.

In the impregnation of the sheet-shaped fiber bundle group with the matrix resin, it is preferable that preliminary impregnation using a concavo-convex roll having a roll outer circumferential surface provided with a plurality of convex portions having a planar front end lace formed thereon as at least one of the paired rolls and main impregnation using a planar roll having a roll outer circumferential surface which is not provided with a concave or a convex as both of the paired rolls are conducted in this order.

In the paired rolls in the preliminary impregnation, only either of the rolls may be a concave-convex roll and the other may be a planar roll or both of the rolls may be a concave-convex roll.

The aspect in which a plurality of convex portions are provided on the roll outer circumferential surface of a concavo-convex roll is not particularly limited, and examples thereof may include a staggered pattern.

Examples of the shape of the planar front end face formed on the convex portion of the concavo-convex roll may include a circular shape and a polygonal shape such as a quadrangular shape, or a pentagonal shape.

Examples of the shape of the convex portion may include a cylindrical shape and a polygonal prism shape such as, a quadrangular prism shape, or a pentagonal prism shape.

The height of the convex portion and the area of the front end face can be appropriately set. Examples of the convex portion may include a convex portion having a height from the roll outer circumferential surface to the front end face of from 1 to 5 mm and an area of the front end face of from 10 to 100 mm$^2$.

The distance between adjacent convex portions is preferably from 5 to 30 mm and more preferably from 8 to 15 mm.

The proportion of the sum of the areas of the front end faces of all the convex portions with respect to the total area of the roll outer circumferential surface of the concavo-convex roll is preferably from 10% to 50% and more preferably from 20% to 40%.

The number of convex portions to be provided on the roll outer circumferential surface of the concavo-convex roll can be set to, for example, from 10 to 100 per 100 cm$^2$ of the roll outer circumferential surface.

The material for the concavo-convex roll is not particularly limited, and examples thereof may include a nitrile rubber, a fluororubber, a butyl rubber, a chloroprene rubber, an ethylene propylene rubber, a silicone rubber, and a urethane rubber.

The hardness of the rubber to be used is preferably set to from A50 to A80 from the viewpoint of fiber bundle opening property due to the pressure and deformation of the rubber at the time of pressing.

The material for the planar roll is not particularly limited, and examples thereof may include metals such as iron and steel and carbon steel, a nitrile rubber, a fluororubber, a butyl rubber, a chloroprene rubber, an ethylene propylene rubber, a silicone rubber, and a urethane rubber.

In the preliminary impregnation using a concavo-convex roll, backflow of the matrix resin on the surface of the laminate is suppressed even when the pressure at the time of pressing is high to a certain extent since the matrix resin enters between the convex portions of the concavo-convex roll. In addition, the laminate can be firmly pressed since the front end face of the convex portion serves as a pressing face. For this reason, it is possible to smoothly impregnate the sheet shaped fiber bundle group with the matrix resin. In addition, in the main impregnation, the sheet-shaped fiber bundle group is sufficiently impregnated with the matrix resin since the laminate is pressed between the planar rolls to further impregnate the sheet-shaped fiber bundle group with the matrix resin. By this, formation of a resin pool in the fiber-reinforced resin material is suppressed and the fluctuation in the fiber content in the fiber-reinforced resin material is also suppressed. As a result, a fiber-reinforced resin material molding having a coefficient of variation Q within the above range is likely to be obtained.

The method for molding with a fiber-reinforced resin material, in which a fiber-reinforced resin material molding is manufactured by molding from the obtained fiber-reinforced resin material is not particularly limited, and a known molding method can be employed.

Examples thereof may include a molding method in which a fiber-reinforced resin material is heated and pressed by using a die corresponding to the shape of an intended fiber-reinforced resin material molding. Heating and pressing may be conducted at the same time or heating may be conducted prior to pressing.

(Method 2 for Manufacturing Fiber-Reinforced Resin Material)

An aspect of the method for manufacturing a fiber-reinforced resin material is not particularly limited, and examples thereof may include a method utilizing an impregnation device.

<Impregnation Device>

The impregnation device to be utilized in an aspect of the method for manufacturing a fiber-reinforced resin material of the present invention is a device for impregnating a sheet-shaped fiber bundle group with a matrix resin by pressing a laminate in which the sheet-shaped fiber bundle group composed of a plurality of opened fiber bundles is sandwiched between a first resin sheet and a second resin sheet.

The impregnation device is equipped with a first impregnation means and may be further equipped with a second impregnation means provided at the stage subsequent to the first impregnation means.

The first impregnation means is equipped with at least a pair of rolls for pressing the laminate from both sides. At least one of the paired rolls of the first impregnation means is a concavo-convex roll having a roll outer circumferential surface provided with a plurality of convex portions having a planar front end face formed thereon.

The second impregnation means is equipped with a plurality of rolls for pressing the laminate from both sides. The plurality of rolls of the second impregnation means are planar rolls having a roll outer circumferential surface which is not provided with a concave or a convex.

As an example of the impregnation device, for example, an impregnation device 100 illustrated in FIG. 1 may be mentioned. Hereinafter, the details of the impregnation device 100 will be described with reference to FIG. 1.

The impregnation device 100 is equipped with a first impregnation means 110 and a second impregnation means 120 provided at the stage subsequent to the first impregnation means 110.

Figure 4:
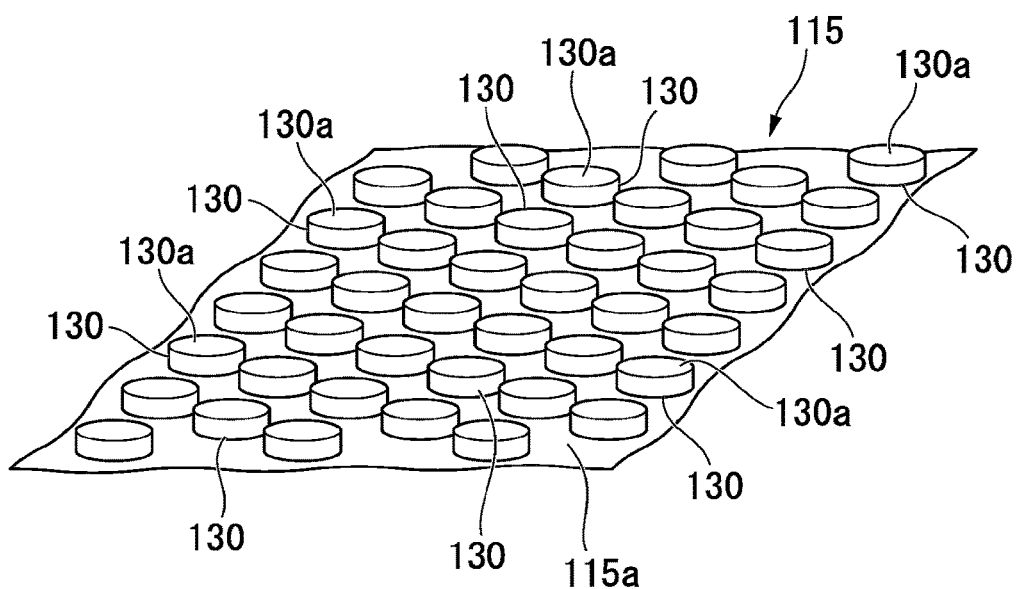
FIG. 4 is in enlarged perspective diagram illustrating a part of a roll outer circumferential surface of an example of a concavo-convex roll of a first impregnation means.

The first impregnation means 110 is equipped with a conveyor 113 constituted by installing an endless belt 112 between a pair of pulleys 111a and 111b and a pressing mechanism 114 provided to the conveyor 113. The pressing mechanism 114 is equipped with four pairs of concavo-convex rolls 115 and planar rolls 116. The paired concavo-convex rolls 115 and planar rolls 116 are provided above and below at the corresponding positions at the upper part of the endless belt 112 so that the concavo-convex rolls 115 become the outer side of the endless belt 112 and the planar roll 116 become the inner side of the endless belt 112. As illustrated in FIG. 4, a plurality of cylindrical convex portions 130 having a circular planar from end face 130a formed thereon are regularly provided on an outer circumferential surface 115a of the concavo-convex roll 115 side by side. The planar roll 116 is a roll having a roll outer circumferential surface which is not provided with a concave or a convex.

In the first impregnation means 110, the endless belt 112 orbits as the pair of pulleys 111a and 111b of the conveyor 113 are rotated in the same direction and a band-shaped laminate S supplied onto the endless belt 112 thus runs to the right side of FIG. 1. Moreover, the laminate S running is pressed from both sides by the paired concavo-convex roll 115 and planar roll 116.

The second impregnation means 120 is equipped with a conveyor 123 constituted by installing an endless belt 122 between a pair of pulleys 121a and 121b and a pressing mechanism 124 provided to the conveyor 123. A pair of tension pulleys 126a and 126b for adjusting the tension to be applied to the endless belt 122 are disposed to the conveyor 123. These tension pulleys 126a and 126b are provided at the lower part of the endless belt 122. The pressing mechanism 124 is equipped with four inner planar rollers 125a provided on the inner side of the endless belt 122 and three outer planar rollers 125b provided on the outer side of the endless belt 122 at the upper part of the endless belt 122. The inner planar rollers 125a and the outer planar rollers 125b are alternately disposed side by side in the length direction of the endless belt 122. The inner planar rollers 125a and the outer planar rollers 125b are a planar roll having a roll outer circumferential surface which is not provided with a concave or a convex.

In the second impregnation means 120, the endless belt 122 orbits as the pair of pulleys 121a 121b of the conveyor 123 are rotated in the same direction and the band-shaped shaped laminate S supplied onto the endless belt 122 thus runs to the right side of FIG. 1. Moreover, the laminate S is pressed from both sides as the band-shaped laminate S passes in a zigzag manner between the inner planar rollers 125a and the outer planar rollers 125b which are alternately disposed.

A fiber-reinforced resin material Q obtained by conducting the impregnation by the first impregnation means 110 and the second impregnation means 120 is wound onto a bobbin B.

Figure 2:
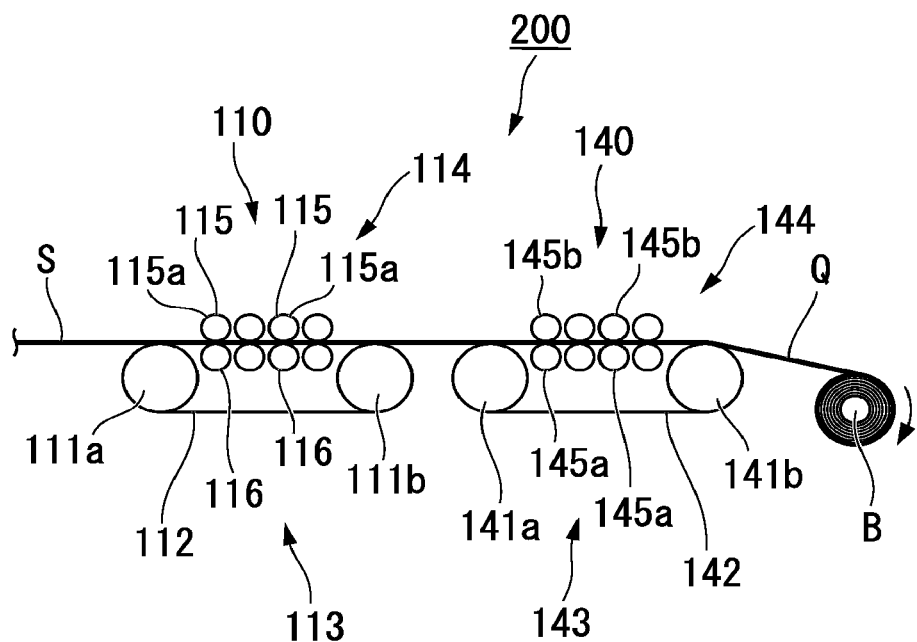
FIG. 2 is a schematic configuration diagram illustrating another example of an impregnation device.

In addition, as another example of the impregnation device, for example, an impregnation device 200 illustrated in FIG. 2 may be mentioned. Hereinafter, the details of the impregnation device 200 will be described with reference to FIG. 2, but the same parts as those in FIG. 1 are denoted by the same reference numerals and description thereon is omitted.

As illustrated in FIG. 2, the impregnation device 200 is equipped with a first impregnation means 110 and a second impregnation means 140 provided at the stage subsequent to the first impregnation means 110. In other words, the impregnation device 200 is equipped with the second impregnation means 140 instead of the second impregnation means 120 of the impregnation device 100.

The second impregnation means 140 is equipped with a conveyor 143 constituted by installing an endless belt 142 between a pair of pulleys 141a and 141b and a pressing mechanism 144 provided to the conveyor 143. The pressing mechanism 144 is equipped with four pairs of inner planar rolls 145a and outer planar rolls 145b provided at the corresponding positions at the upper part of endless belt 142. The inner planar rolls 145a and the outer planar rolls 145b are provided above and below so that the inner planar rolls 145a become the inner side of the endless belt 142 and the outer planar rolls 145b become the outer side of the endless belt 142.

In the second impregnation means 140, the endless belt 142 orbits as the pair of pulleys 141a and 141b of the conveyor 143 are rotated in the same direction and the band-shaped laminate S supplied onto the endless belt 142 thus runs to the right side of FIG. 2. Moreover, the laminate S running is pressed from both sides by the paired inner planar rolls 145a and the outer planar rolls 145b.

A fiber-reinforced resin material Q obtained by conducting the impregnation by the first impregnation means 110 and the second impregnation means 140 is wound onto a bobbin B.

Figure 3:
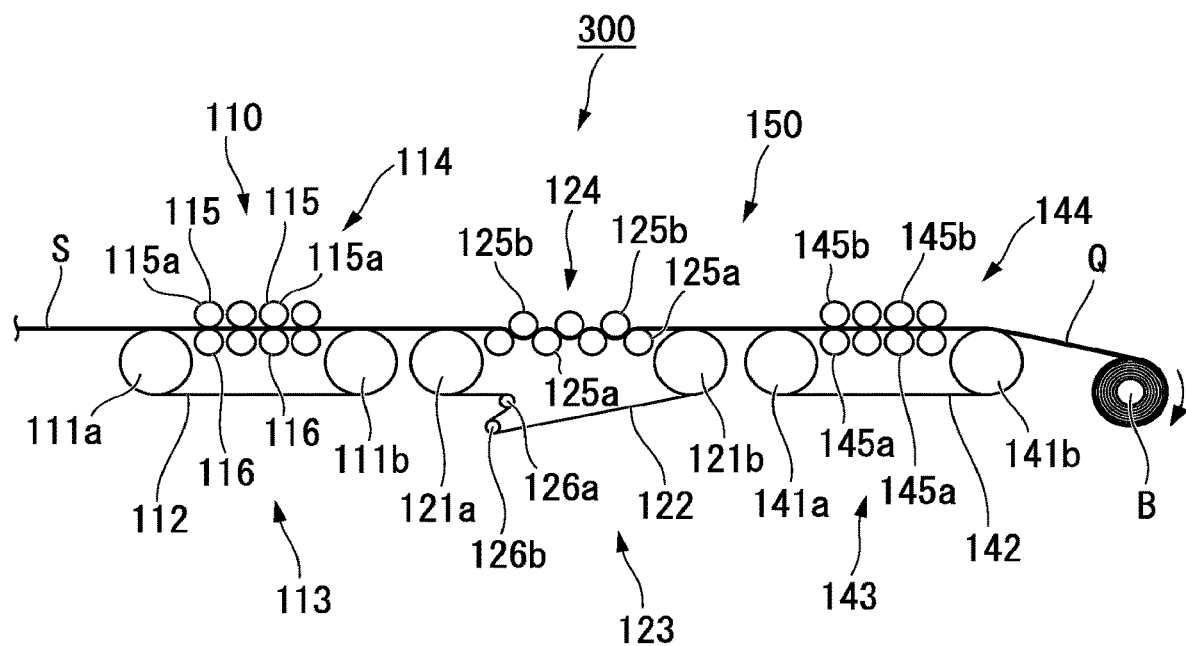
FIG. 3 is a schematic configuration diagram illustrating another example of an impregnation device.

In addition, as another example of the impregnation device, for example, an impregnation device 300 illustrated in FIG. 3 may be mentioned. Hereinafter, the details of the impregnation device 300 will be described with reference to FIG. 3, but the same parts as those in FIG. 1 and FIG. 2 are denoted by the same reference numerals and description thereon is omitted.

As illustrated in FIG. 3, the impregnation device 300 is equipped with a first impregnation means 110 and a second impregnation means 150 provided at the stage subsequent to the first impregnation means 110. In other words, the impregnation device 300 is equipped with the second impregnation means 150 instead of the second impregnation means 120 of the impregnation device 100.

The second impregnation means 150 is equipped with a conveyor 123 constituted by installing an endless belt 122 between a pair of pulleys 121a and 121b, a pressing mechanism 124 provided to the conveyor 123, a conveyor 143 which is provided at the stage subsequent to the conveyor 123 and constituted by installing an endless belt 142 between a pair of pulleys 141a and 141b, and a pressing mechanism 144 provided to the conveyor 143. In other words, the second impregnation means 150 is equipped with the pressing mechanism 124 and the conveyor 123 of the zigzag type of the second impregnation means 120 of the impregnation device 100 and the pressing mechanism 144 and the conveyor 143 of the nipping type of the second impregnation means 140 of the impregnation device 200 in this order.

A fiber-reinforced resin material Q obtained by conducting the impregnation by the first impregnation means 110 and the second impregnation means 150 is wound onto a bobbin B.

The concavo-convex roll of the first impregnation means of the impregnation device has a roll outer circumferential surface provided with a plurality of convex portions having a planar front end face formed thereon, and for example, the concavo-convex roll 115 is provided with a plurality of convex portions having a circular planar front end face formed thereon.

The front end face of the convex portion serves as a pressing face for pressing the laminate when the laminate is pressed by a pair of rolls equipped with a concavo-convex roll.

The planar shape of the front end face of the convex portion provided on the roll outer circumferential surface of the concavo-convex roll is not limited to a circular shape, and it may be, for example, a polygonal shape such as a quadrangular shape or a pentagonal shape. The shape of the convex portion is not limited to a cylindrical shape, and it maybe, for example, a polygonal prism shape such as a quadrangular prism shape or a pentagonal prism shape. The convex portion may have a shape which is narrowed toward the front end.

The shape of the convex portion and the shape of the front end face thereof may be one kind or two or more kinds.

It is preferable that the convex portions provided on the roll outer circumferential surface of the concavo-convex roll are regularly provided side by side so as to form a certain pattern. The pattern for providing the convex portion may be a pattern which can uniformly apply a pressure to the laminate when pressing the laminate, and examples thereof may include a staggered pattern.

Figure 5:
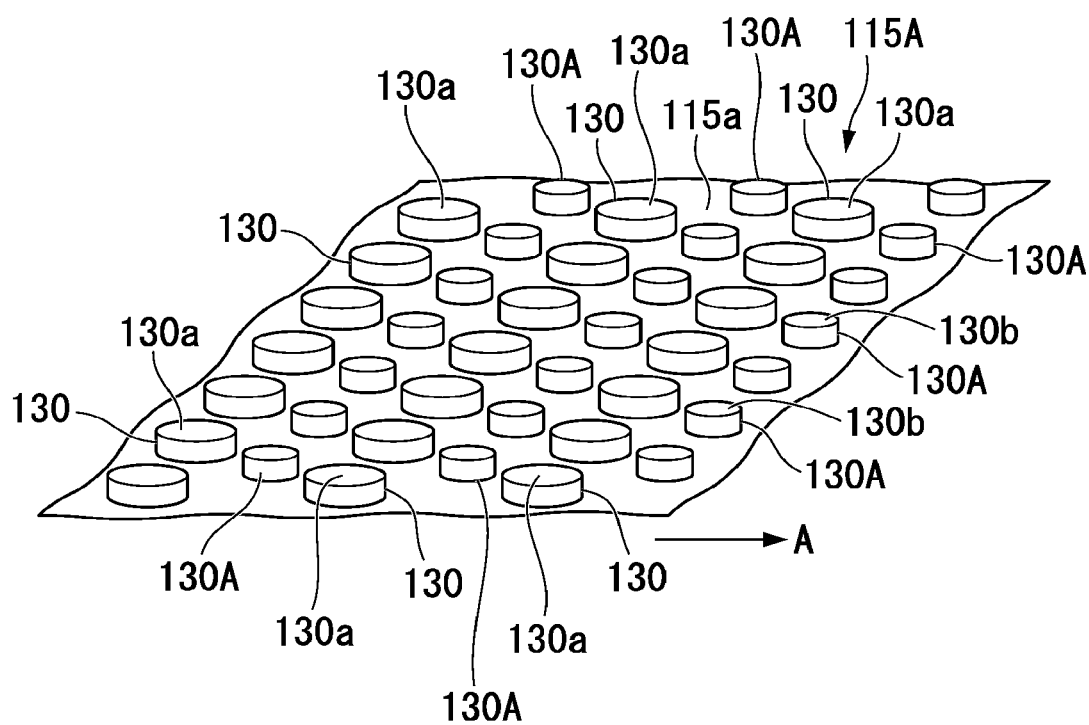
FIG. 5 is an enlarged perspective diagram illustrating a pan of a roll outer circumferential surface of another example of a concavo-convex roll of a first impregnation means.

In addition, with regard to the convex portion to be provided on the roll outer circumferential surface of the concavo-convex roll, a plurality of convex portions having a large front end face area and a plurality of convex portions having a small front end face area may be disposed in a direction inclined with respect to the roll axis direction of the concavo-convex roll when the roll outer circumferential surface is viewed from the front and may be alternately provided in the roll axis direction. Specifically, the concavo-convex roll may be, for example, a concavo-convex roll 115A illustrated in FIG. 5.

The concavo-convex roll 115A has a roll outer circumferential surface 115a provided with a plurality of cylindrical convex portions 130 having a circular front end face 130a formed thereon and a plurality of cylindrical convex portions 130A having a circular planar front end face 130b which is formed thereon and has an area smaller than that of the front end face 130a and a diameter smaller than that of the convex portion 130. The plurality of convex portions 130 and the plurality of convex portions 130A are provided so that the convex portion 130 and the convex portion 130A are respectively arranged in a direction inclined with respect to a roll axis direction A of the concavo-convex roll when the roll outer circumferential surface 115a is viewed from the front and alternately positioned in the roll axis direction A.

By adopting an aspect in which the convex portions to be provided on the roll outer circumferential surface of the concavo-convex roll are disposed in such a pattern, the matrix resin is likely to enter between the convex portion having a large front end face area and the convex portion having a small front end face area and backflow of the matrix resin is less likely to occur when the laminate is pressed.

The height of the convex portion to be provided on the roll outer circumferential surface of the concavo-convex roll, namely, the distance from the roll outer circumferential surface to the front end face of the convex portion is preferably from 1 to 5 mm and more preferably 1.5 to 3.5 mm. The sheet-shaped fiber bundle group is likely to be impregnated with the matrix resin when the height of the convex portion is equal to or greater than the lower limit value, and backflow of the matrix resin is less likely to occur in the surface layer of the laminate at the time of pressing of the laminate by the first impregnation means when the height is equal to or smaller than the upper limit value.

The area of the front end face of each convex portion of the convex portions to be provided on the roll outer circumferential surface of the concavo-convex roll is preferably from 10 to 100 mm$^2$ and more preferably from 20 to 50 mm$^2$.

The sheet-shaped fiber bundle group is likely to be impregnated with the matrix resin when the area of the front end face of each convex portion is equal to or greater than the lower limit value, and backflow of the matrix resin is less likely to occur in the surface layer of the laminate at the time of pressing of the laminate by the first impregnation means when the area is equal to or smaller than the upper limit value.

The proportion of the sum of areas of the front end faces of all the convex portions to be provided on the roll outer circumferential surface of the concavo-convex roll with respect to the total area of the roll outer circumferential surface of the concavo-convex roll is preferably from 10% to 50% and more preferably from 20% to 40%.

The sheet-shaped fiber bundle group is likely to be impregnated with the matrix resin when the proportion of the sum of areas of the front end faces of all the convex portions to be provided on the roll outer circumferential surface of the concavo-convex roll with respect to the total area of the roll outer circumferential surface of the concavo-convex roll is equal to or greater than the lower limit value, and backflow of the matrix resin is less likely to occur in the surface layer of the laminate at the time of pressing of the laminate by the first impregnation means when the proportion is equal to or smaller than the upper limit value.

The distance between the convex portions to be provided on the roll outer circumferential surface of the concavo-convex roll is preferably from 5 to 30 mm and more preferably from 8 to 15 mm.

The sheet-shaped fiber bundle group is likely to be impregnated with the matrix resin when the distance between the convex portions is equal to or greater than the lower limit value, and backflow of the matrix resin is less likely to occur in the surface layer of the laminate at the time of pressing of the laminate by the first impregnation means when the distance is equal to or smaller than the upper limit value.

The number of convex portions to be provided on the roll outer circumferential surface of the concavo-convex roll is not particularly limited, and it may be, for example, from 10 to 100 per 100 cm$^2$ of the roll outer circumferential surface.

The material for the concavo-convex roll is not particularly limited, and examples thereof may include a nitrile rubber, a fluororubber, a butyl rubber, a chloroprene rubber, an ethylene propylene rubber, a silicone rubber, and a urethane rubber.

The hardness of the rubber to be used is preferably set to from A50 to A80 from the viewpoint of fiber bundle opening property due to pressure and deformation of the rubber at the time of pressing.

The material for the planar roll of the first impregnation means and the second impregnation means is not particularly limited, and examples thereof may include metals such as iron and steel and carbon steel, a nitrile rubber, a fluororubber, a butyl rubber, a chloroprene rubber, an ethylene propylene rubber, a silicone rubber, and a urethane rubber.

In the paired rolls of the first impregnation means, only either of the rolls may be a concave-convex roll and the other may be a planar roll or both of the rolls may be a concave-convex roll.

The rolls to be equipped to the first impregnation means 110 are four pairs, but the rolls may be three or fewer pairs or five or more pairs.

The number of planar rolls of the second impregnation means is not particularly limited. Specifically, in the case of a zigzag type such as the second in means 120, the number of planar rolls is not limited to seven but may be six or fewer or eight of more. In addition, in the case of a nip type such as the second impregnation means 140, the number of planar rolls is not limited to four pairs but may be three or fewer pairs or five or more pairs.

In a case in which the impregnation device to be utilized in an aspect of the method for manufacturing a fiber-reinforced resin material of the present invention is equipped with a second impregnation means provided at the stage subsequent to a first impregnation means together with the first impregnation means, it is possible to further impregnate the fiber bundle group with the matrix resin by pressing the laminate by the second impregnation means which sandwiches the laminate between planar rolls after the fiber bundle group is impregnated with the matrix resin by pressing the laminate by the first impregnation means equipped with a concavo-convex roll.

As the first impregnation means is equipped with a concavo-convex roll, the matrix resin enters between a plurality of convex portions provided on the roll outer circumferential surface of the concavo-convex roll even when the pressure at the time of pressing is high to a certain extent and the occurrence of back flow of the matrix resin in the surface layer of the laminate is suppressed even in a case in which the fiber bundle for forming the sheet-shaped fiber bundle group is opened and flattened. In addition, the front end face of the convex portion serves as a pressing face, and it is thus possible to firmly press the laminate and to smoothly impregnate the sheet-shaped fiber bundle group with the matrix resin. In addition, in the second impregnation means, the laminate is pressed by being sandwiched between the planar rolls and a fiber-reinforced resin material which contains the sheet-shaped fiber bundle group sufficiently impregnated with the matrix resin and exhibits excellent mechanical properties is thus obtained.

In addition, in the impregnation device to be used in the present invention, an effect that the fiber bundle is further opened through pressing by the first impregnation means is also obtained as the convex-concave roll of the first impregnation means is equipped with a convex portion having a planar front end face formed thereon.

Incidentally, as the concavo-convex roll and planar roll of the first impregnation means of the impregnation device, it is also possible to use the concave-convex roll and the planar roll described in the lamination and impregnation step of the method 1 for manufacturing a fiber-reinforced resin material.

<Manufacture of Fiber-Reinforced Resin Material>

The method for manufacturing a fiber-reinforced resin material of the present invention is a method for manufacturing a fiber-reinforced resin material to be used in the manufacture of the fiber-reinforced resin material molding of the present invention which includes a first impregnation step using a concavo-convex roll having a roll outer circumferential surface provided with a plurality of convex portions having a planar front end face formed thereon as a step of pressing a laminate in which a sheet-shaped fiber bundle group composed of a plurality of fiber bundles is sandwiched between a first resin sheet containing a matrix resin and a second resin sheet containing a matrix resin by using a roll to impregnate the sheet-shaped fiber bundle group with the matrix resin. In addition, it is preferable that the method for manufacturing a fiber-reinforced resin material of the present invention includes a second impregnation step using a planar roll having a roll outer circumferential surface which is not provided with a concave or a convex as a step of further impregnating the sheet-shaped fiber bundle group with the matrix resin after the first impregnation step.

The first impregnation step and/or the second impregnation step in the method for manufacturing a fiber-reinforced resin material of the present invention can be conducted by using the impregnation device described above.

The manufacture of a fiber-reinforced resin material by the method for manufacturing a fiber-reinforced resin material of the present invention can be conducted by using an apparatus for manufacturing a fiber-reinforced resin material.

Figure 6:
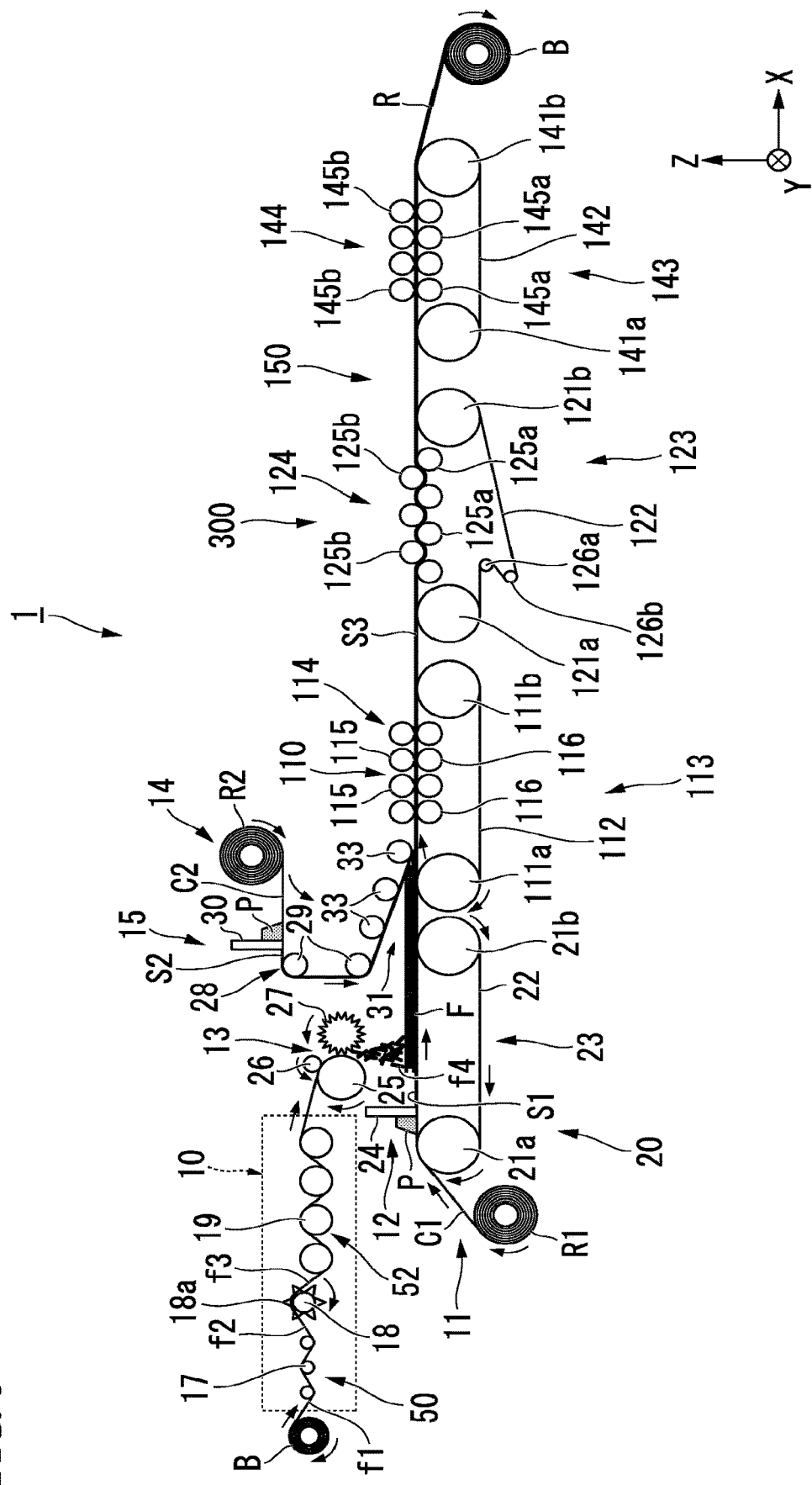
FIG. 6 is a schematic configuration diagram illustrating an example of an apparatus for manufacturing a fiber-reinforced resin material to be used in a method for manufacturing a fiber-reinforced resin material.

As an example of the apparatus for manufacturing a fiber-reinforced resin material, for example, an apparatus 1 for manufacturing a fiber-reinforced resin material illustrated in FIG. 6 (hereinafter also simply referred to as a "manufacturing apparatus 1") may be mentioned. Hereinafter, the details of the manufacturing apparatus 1 will be described with reference to FIG. 6.

The apparatus 1 for manufacturing a fiber-reinforced resin material to be used in the method for manufacturing a fiber-reinforced resin material according to the present embodiment (hereinafter simply referred to as a manufacturing apparatus 1) will be described with reference to FIG. 6. Incidentally, in the following description, an XYZ orthogonal coordinate system illustrated in FIG. 6 is set and the positional relationship of each member will be described with reference to this XYZ orthogonal coordinate system if necessary.

The manufacturing apparatus 1 is equipped with an opening and dividing unit 10, a first carrier sheet supply unit 11, a first conveyance unit 20, a first coating unit 12, a cutting machine 13, a second carrier sheet supply unit 14, a second conveyance unit 28, a second coating unit 15, a lamination unit 31, and an impregnation device 300.

The opening and dividing unit 10 is equipped with an opening unit 50 for opening, a long fiber f1 bundle n of a large tow in the width direction (Y axis direction) and a dividing unit 52 for dividing the opened fiber bundle f2 into a plurality of fiber bundles f3.

The opening unit 50 is equipped with a plurality of opening bars 17 which are provided side by side in the X axis direction at intervals. The plurality of opening bars 17 are provided such that the fiber bundle f1 is widened in the width direction by means such as heating, scraping, and shaking caused by the respective opening bars 17 when the fiber bundle f1 passes above and below the respective opening bars 17 in a zigzag manner in order. The flat fiber bundle f2 is obtained as the fiber bundle f1 is opened.

The dividing unit 52 is equipped with a plurality of rotary blades 18 and a plurality of godet rollers 19.

The plurality of rotary blades 18 are disposed side by side at a predetermined interval in the width direction (Y axis direction) of the opened liber bundle f2. In addition, the rotary blades 18 are each provided with a plurality of cutting teeth 18a continuously arranged side by side in the circumferential direction. By allowing the fiber bundle f2 to pass while rotating the rotary blades 18, the fiber bundle f2 is intermittently pierced with the plurality of cutting teeth 18a and divided in the width direction to form a plurality of fiber bundles f3. However, the plurality of divided fiber bundles f3 are not in a state of being completely divided but are in a state of being partially undivided (connected state).

The plurality of godet rollers 19 guide the fiber bundles f3 after dividing to the cutting machine 13.

The first carrier sheet supply unit 11 supplies a long first carrier sheet C1 unwound from a first source roll R1 to the first conveyance unit 20. The first conveyance unit 20 is equipped with a conveyor 23 constituted by installing an endless belt 22 between a pair of pulleys 21a and 21b. The endless belt 22 orbits as the pair of pulleys 21a and 21b of the conveyor 23 are rotated in the same direction and the first carrier sheet C1 on the surface of the endless belt 22 is conveyed toward the right side in the X axis direction.

The first coating unit 12 is positioned immediately above the pulley 21a side of the first conveyance unit 20 and is equipped with a coater 24 for supplying a paste P containing a matrix resin. As the first carrier sheet C1 passes through the corner 24, the paste P is applied on the surface of the first carrier sheet C1 in a predetermined thickness (from 100 to 1000 μm and preferably from 200 to 800 μm) to form a first resin sheet S1. The first resin sheet S1 runs along with the conveyance of the first carrier sheet C1.

The cutting machine 13 is positioned above the first carrier sheet C1 at the stage subsequent to the first coating unit 12 in the conveyance direction. The cutting machine 13 continuously cuts the fiber bundle f3 after dividing Into a predetermined length and is equipped with a guide roller 25, a pinch roller 26, and a cutter roller 27. The guide roller 25 guides the supplied fiber bundle f3 downward while rotating. The pinch roller 26 rotates in a direction opposite to that or the guide roller 25 while sandwiching the fiber bundle f3 between the pinch roller 26 and the guide roller 25. By this, the fiber bundle f1 is drawn out from a bobbin B1. The cutter roller 27 cuts the fiber bundle f3 to a predetermined length while rotating. A fiber bundle f4 cut into a predetermined length by the cutting machine 13 is dropped and scattered onto a first resin sheet S1 to form a sheet-shaped fiber bundle group F.

The second carrier sheet supply unit 14 supplies a long second carrier sheet C2 unwound from a second source roll R2 to a second conveyance unit 28. The second conveyance unit 28 is positioned above the first carrier sheet C1 to be conveyed by the conveyor 23 and is equipped with a plurality of guide rollers 29. The second conveyance unit 28 conveys the second carrier sheet C2 supplied from the second carrier sheet supply unit 14 in a direction (left side of the X axis direction) opposite to the first carrier sheet C1 and then reverses the conveyance direction of the second carrier sheet C2 by the plurality of guide rollers 29 so that the conveyance direction of the second carrier sheet C2 is the same (right side of the X axis direction) as the conveyance direction of the first carrier sheet C1.

The second coating unit 15 is positioned immediately above the second carrier sheet C2 Which is being conveyed in a direction opposite to that of the first carrier sheet C1 and equipped with a coater 30 for supplying the paste P containing a matrix resin. As the second carrier sheet C2 passes through the coater 30, the paste P applied on the surface of the second carrier sheet C2 in a predetermined thickness (from 100 to 1000 μm and preferably from 200 to 800 μm) to form a second resin sheet S2. The second resin sheet S2 runs along with the conveyance of the second carrier sheet C2.

The lamination unit 31 is positioned at the stage subsequent to the cutting machine 13 of the first conveyance unit 20. The lamination unit 31 is positioned above the pulley 21b of the conveyor 23 and equipped with a plurality of lamination rollers 33. The plurality of lamination rollers 33 are disposed side by side in the conveyance direction in a state of being in contact with the back face of the second carrier sheet C2 on which the second resin sheet S2 is formed. In addition, the plurality of lamination rollers 33 are disposed so that the second carrier sheet C2 gradually approaches the first carrier sheet C1.

In the lamination unit 31, the first carrier sheet C1 and the second carrier sheet C2 are lamianted together in a state of sandwiching the first resin sheet S1, the sheet-shaped fiber bundle group F, and the second resin sheet S2 therebetween. By this, a laminate is formed in which the first resin sheet S1, the sheet-shaped fiber bundle group F, and the second resin sheet S2 are laminated from the bottom in this order. Here, one in which the first carrier sheet C1 and the second carrier sheet C2 are laminated together in a state of sandwiching the laminate is referred to as a laminated sheet S3.

The impregnation device 300 is positioned at the stage subsequent to the lamination unit 31. The sheet-shaped fiber bundle group is impregnated with the matrix resin in the laminate as the laminated sheet S3 is sequentially pressed by the first impregnation means 110 and the second impregnation means 150 of the impregnation device 300. By this, an original material R containing the fiber-reinforced resin material is obtained. The original material R can be cut into a predetermined length and used in molding. Incidentally, the first carrier sheet C1 and the second carrier sheet C2 are peeled off from the fiber-reinforced resin material before the fiber-reinforced resin material is used in the molding.

Next, a method for manufacturing a fiber-reinforced resin material using the manufacturing apparatus 1 will be described. The method for manufacturing a fiber-reinforced resin material which will be described below and uses the manufacturing apparatus 1 includes an opening and dividing step of widening a long fiber bundle f1 in the width direction to become a fiber bundle through opening and further dividing the fiber bundle f2 in the width direction to a plurality of fiber bundles f3 through dividing, a scattering step of continuously cutting the fiber bundles f3 and scattering a plurality of cut fiber bundles f4 on, a first resin sheet S1 in a sheet shape to form a sheet-shaped fiber bundle group F, a lamination step of laminating a second resin sheet S2 onto the sheet-shaped fiber bundle group F to form a laminate in which the first resin sheet S1, the sheet-shaped fiber bundle group F, and the second resin sheet S2 are laminated from the bottom in this order, a first impregnation step of impregnating the sheet-shaped fiber bundle group F with a matrix resin by pressing the laminate by the first impregnation means 110 of the impregnation device 300, and a second impregnation step of further impregnating the sheet-shaped fiber bundle group F with the matrix resin by pressing the laminate after the first impregnation step by a second impregnation means 150 to obtain a fiber-reinforced resin material.

<Opening and Dividing Step>

A long fiber bundle f1 of a large tow is unwound from a bobbin B positioned at the former stage of the opening and dividing unit 10, allowed to pass above and below the opening bars 17 in a zigzag manner in order in the opening unit 50, and widened in the width direction through opening to become a fiber bundle f2 in a flat state. Furthermore, the fiber bundle f2 is allowed to pass the dividing unit 52 while rotating a plurality of rotary blades 18 to be intermittently pierced with a plurality of cutting teeth 18a and divided in the width direction to form a plurality of fiber bundles f3.

The fiber bundle is preferably a carbon fiber bundle. Incidentally, a glass fiber bundle may be used as the fiber bundle. The fiber bundle of a large tow is not particularly limited, and examples thereof may include a fiber bundle having a number of fibers of 20,000 or more.

<Scattering Step>

A long first carrier sheet C1 is unwound from a first source roll R1, supplied to a first conveyance unit 20 by a first carrier sheet supply unit 11, and coated with a paste P in a predetermined thickness by a first coating unit 12 to form a first resin sheet S1. A first carrier sheet C1 is conveyed by the first conveyance unit 20 to run the first resin sheet S1 on the first carrier sheet C1.

The matrix resin to be contained M the paste P is not particularly limited, and examples thereof may chide an unsaturated polyester resin. The paste P may be blended with a filler such as calcium carbonate, a shrinkage diminishing agent, a releasing agent, a curing initiator, a thickening agent, and the like.

In addition, the long fiber bundle f3 after dividing supplied from the opening and dividing unit 10 is continuously cut into a predetermined length by the cutting machine 13 and the cut fiber bundle f4 is dropped and scattered onto the first resin sheet S1. By this, the sheet-shaped fiber bundle groups F in which the respective fiber bundles f4 are scattered in random fiber orientations is continuously formed on the running first resin sheet S1.

<Lamination Step>

A long second carrier sheet C2 is unwound from a second source roll R2 and supplied to a second conveyance unit 28 by a second carrier sheet supply unit 14. The paste P is applied on the surface of the second carrier sheet C2 in a predetermined thickness by a second coating unit 15 to form a second resin sheet S2. The second carrier sheet C2 is conveyed to run the second resin sheet S2, and the first carrier sheet C1 and the second carrier sheet C2 are laminated together in the lamination unit 31. By this, a laminated sheet S3 containing a laminate in which the first resin sheet S1, the sheet-shaped fiber bundle group F, and the second resin sheet S2 are laminated from the bottom in this order sandwiched between the first carrier sheet C1 and the second carrier sheet C2 is formed.

<First Impregnation Step>

In the first impregnation means 110 of the impregnation device 300, the laminated sheet S3 containing the laminate is pressed by allowing the laminated sheet S3 to pass between a concavo-convex roll 115 and a planar roll 116 of a pressing mechanism 114 while rotating these rolls to impregnate the sheet-shaped fiber bundle group F with a part of the matrix resin in the first resin sheet S1 and the second resin sheet S2. In the present invention, it is preferable to open each fiber bundle forming the sheet-shaped fiber bundle group as well as to impregnate the sheet-shaped fiber bundle group with the matrix resin through pressing by the first impregnation means in the first impregnation step.

<Second Impregnation Step>

The laminated sheet S3 after impregnation by the first impregnation means 110 is pressed by allowing the laminated sheet S3 to pass between an inner planar roller 125a and an outer planar roller 125b of a pressing mechanism 124 in a second impregnation means 150 in a zigzag manner while rotating these rollers. The pressing by the pressing mechanism 124 of the second impregnation means 150 is set to be conducted at a higher pressure than in the pressing by the concavo-convex roll 115 and the planar roll 116 in the pressing mechanism 114. By this, the sheet-shaped fiber bundle group F is further impregnated with the matrix resin in the first resin sheet S1 and the second resin sheet S2.

Furthermore, the laminated sheet S3 is pressed by allowing the pasted sheet S3 to pass between an inner planar roll 145a and an outer planar roll 145b of a pressing mechanism 144 while rotating these rolls. The pressing by the inner planar roll 145a and the outer planar roll 145b of the pressing mechanism 144 is set to be conducted at a higher pressure than in the pressing by the inner planar roller 125a and the outer planar roller 125b of the pressing mechanism 124. By this, the rest of the matrix resin in the first resin sheet S1 and the second resin sheet S2 completely penetrates into the sheet-shaped fiber bundle group F. By this, an original material R is obtained in which the fiber-reinforced resin material is sandwiched between the first carrier sheet C1 and the second carrier sheet C2.

In the method for manufacturing a fiber-reinforced resin material of the present invention, the sheet-shaped fiber bundle group F is impregnated with the matrix resin by pressing the laminate by the first impregnation means equipped with a concavo-convex roll in the first impregnation step.

By this, the matrix resin enters between the convex portions even when the pressure at the time of pressing is high to a certain extent, and the occurrence of backflow of the matrix resin on the surface of the laminate is thus suppressed even in a case in which the fiber bundle for forming the sheet-shaped fiber bundle group is opened and flattened.

In addition, the front end face of the convex portion serves as a pressing face, and it is thus possible to firmly press the laminate and to smoothly impregnate the sheet-shaped fiber bundle group with the matrix resin.

Furthermore, the sheet-shaped fiber bundle group is further impregnated with the matrix resin by pressing the laminate by the second impregnation means which sandwiches the laminate between the planar rolls in the second impregnation step, and it is thus possible to manufacture a fiber-reinforced resin material which contains the sheet-shaped fiber bundle group sufficiently impregnated with the matrix resin and exhibits excellent mechanical properties.

In addition, in the present invention, the pressing is conducted by a concavo-convex roll equipped with a convex portion having a planar front end face formed thereon in the first impregnation means, it is thus possible to further open the fiber bundle while suppressing the backflow of the matrix resin.

Incidentally, the method for manufacturing a fiber-reinforced resin material a the present invention is not limited to the method using the manufacturing apparatus 1. For example, it may be a method using a manufacturing apparatus equipped with the impregnation device 100 or the impregnation device 200 instead of the impregnation device 300.

EXAMPLES

Hereinafter, the present invention will be described in detail with reference to Examples, but the present invention is not limited by the description below.

[Average Value P of Fiber Content and Coefficient of Variation Q in Fiber Content]

The fiber-reinforced resin material molding of each example was cut in the thickness direction, and the cut pieces were embedded in a methacrylic resin (product name "Technovit 4004", manufactured by Heraeus) so as to cover the cut face, and polishing was then conducted to expose the cut face. Subsequently, the cut face was imaged by using an optical microscope (product name "BX51M", manufactured by OLYMPUS CORPORATION) at a magnification of 100-fold. An image of the cut face was partitioned into unit zones of 0.1 mm square by using image processing software (product name "Winroof 2015" developed by MITANI CORPORATION), and binarization was then conducted by taking 136 as the threshold value of brightness to distinguish the fiber bundle from the matrix resin. Subsequently, the proportion of the area of the region having a brightness to be equal to or higher than the threshold value (region occupied by the fiber bundle) with respect to the area of the unit zone was measured for each of 2000 unit zones, and the fiber content was thus determined. Subsequently, the average value of the fiber contents among 2000 unit zones (average value P) and the standard deviation thereof were calculated, and the coefficient of variation Q was calculated by dividing the standard deviation by the average value P.

[Degree of Roughness β]

The fiber-reinforced resin material of each example was aged at a temperature of 25±5° C. for 1 week, and two pieces having a size of 300 mm in length and 300 mm in width were then cut out therefrom by using a rolling cutter and laminated so that the longitudinal directions of these fiber-reinforced resin materials having a weight of about 250 g per piece were the same. Twenty five specimens having a size of 15 mm in length and 15 mm in width were cut out from the left and right two rows and the upper and lower two rows based on the center of this laminate of fiber-reinforced resin materials having a weight of about 500 g at an interval of 30 mm.

Subsequently, the specimen was rotated around the thickness direction thereof as the axis while being irradiated with X-rays by a transmission method using an X-ray device, a diffracted X-ray was captured by using a detector disposed at a diffraction angle 2 θ=25.4°, and the brightness ($I(\phi_i)$) at the i-th rotation angle ($\phi_i$) was measured provided that $I(\phi_i)$ was normalized so that the integrated intensity was 10,000.

Upon this measurement of the degree of roughness β, Empyrean manufactured by Malvern PANalytical B. V. was used as an X-ray diffractometer, the tube voltage was set to 45 kV, and the tube current was set to 40 mA. In addition, a double cross slit was attached to the incident side, and the vertical and horizontal widths of the upstream and downstream slits were all set to 2 mm. Furthermore, a parallel plate collimator was attached to the light receiving side, and a proportional counter was attached to the detector. The crystal orientation of the specimen was evaluated by capturing the measurement data at an interval of 0.04 degree.

Incidentally, the measurement conditions described above are merely an example and the measurement can be conducted by appropriately changing the measurement conditions within a range in which the purpose of the measurement of degree of roughness β is not changed.

Subsequently, $f(\phi_i)$ was determined from the measured $I(\phi_i)$ by Equation (2), and the degree of roughness β was further determined as an average value of the measured values for 25 specimens by Equation (1).

[Average Value and Standard Deviation of Degree of Crystal Orientation fa]

Twenty five specimens having a size of 15 mm in length and 15 mm in width were cut out in the same manner as in the preparation of a specimen for the degree of roughness β. The brightness ($I(\phi_i)$) its measured for the 25 specimens cut out provided that $I(\phi_i)$ was normalized so that the integrated intensity was 10,000. Subsequently, the coefficient of orientation a for the respective 25 specimens was determined by Equation (5) using the $I(\phi_i)$ thus measured. Furthermore, the degree of crystal orientation fa was determined for the respective 25 specimens by Equation (4) using the coefficient of orientation a thus obtained, and the average value and standard deviation thereof were calculated.

Example 1

A carbon fiber bundle (trade name "TR50S15L", manufactured by Mitsubishi Rayon Co., Ltd.) was used as a long fiber bundle.

To 100 parts by mass of an epoxy acrylate resin (product name: NEOPOL 8051, manufactured by Japan U-Pica Company Ltd.) which was a thermosetting resin, 0.5 part by mass of a 75% solution of 1,1-di(t-butylperoxy)cyclohexane (product name: PERHEXA C-75, manufactured by NOF Corporation) and 0.5 part by mass of a 74% solution of t-butylperoxy isopropyl carbonate (product name: Kayacarbon BIC-75, manufactured by Kayaku Akzo Corporation) as a curing agent, 0.35 part by mass of a phosphoric acid ester-based derivative composition (product name: MOLD WIZ INT-EQ-6, manufactured by Axel Plastic Research Laboratories, Inc.) as an internal releasing agent, 15.5 parts by mass of modified diphenylmethane diisocyanate (product name: COSMONATE LL, manufactured by KUMHO MITSUI CHEMICALS, CORP.) as a thickener, and 0.02 part by mass of 1,4-benzoquinone (product name: p-benzoquinone, manufactured by Wako Pure Chemical Industries, Ltd.) as a stabilizer were added, and these were thoroughly mixed and stirred to obtain a paste containing a matrix resin.

The paste was applied on the first carrier sheet being conveyed to form a first resin sheet having a thickness of 0.45 mm. In addition, a carbon fiber bundle which was subjected to opening and dividing and had a thickness of 0.05 mm and a width of 7.5 mm was cut by using a cutting machine and dropped as a chopped fiber bundle having an average fiber length of 50.8 mm to form a sheet-shaped fiber bundle group having a thickness of 1.3 mm. A plurality of inclined comb teeth having a circular cross-sectional shape with a diameter of 3 mm were disposed side by side between the first resin sheet and the cutting machine so as to be parallel to the running direction of the first resin sheet. The height of the inclined comb tooth from the first resin sheet was set to 400 mm, the interval between the adjacent inclined comb teeth was set to 65 mm, and the inclination angle of the inclined comb tooth with respect to the horizontal direction was set to 15°. The line speed was set to 1.5 m/min.

The paste was applied on the second carrier sheet being conveyed above the first carrier sheet in the direction opposite to the first carrier sheet to form a second resin sheet having a thickness of 0.45 mm, and the second resin sheet was laminated on the sheet-shaped fiber bundle group by reversing the conveyance direction thereof. Furthermore, the laminate of the first resin sheet, the sheet-shaped fiber bundle group, and the second resin sheet was subjected to preliminary impregnation and main impregnation to obtain a sheet-shaped fiber-reinforced resin material having a thickness of 2 mm. The preliminary impregnation was conducted by using five pairs of rolls in which a concavo-convex roll having a cylindrical convex portion (height of convex portion: 3 mm, area of front end face of convex portion: 38 mm², and pitch of convex portion: 8 mm) provided on the roll outer circumferential surface in a staggered manner was combined with a planar roll. The main impregnation was conducted by using eleven pairs of planar rolls.

The degree of roughness β of the fiber-reinforced resin material thus obtained was 3.89, and the total value of the average value and standard deviation of the degree of crystal orientation fa of the fiber bundle determined by taking the 0° direction as a reference was 0.077.

The fiber-reinforced resin material thus obtained was aged at a temperature of 25±5° C. for 1 week and cut into 250 mm×250 mm, and two pieces (about 156 g in total) of the cut fiber-reinforced resin material were put in the center of a panel molding die (300 mm×300 mm×2 mm, surface chromium plating finish) having a fitting portion at the end portion by aligning the conveyance direction (MD direction) of the fiber-reinforced resin material in the manufacturing apparatus. Thereafter, the fiber-reinforced resin material was heated and pressed in the die at 140° C. and 8 MPa for 5 minutes to obtain a fiber-reinforced resin material molding.

The average value P of fiber content in the fiber-reinforced resin material molding thus obtained was 55.7%, and the coefficient of variation Q in the fiber content was 26.1%.

In addition, the directions of the fiber axes of the fiber bundles on the cut face along the plane direction of the fiber-reinforced resin material molding thus obtained were substantially randomly distributed.

Next, in order to measure the flexural strength and flexural modulus of elasticity of the fiber-reinforced resin material molding, six specimens having a length of 110 mm and a width of 25 mm were cut out from the fiber-reinforced resin material molding along the conveyance direction (0° direction) and the width direction (90° direction) of the fiber-reinforced resin material, respectively. Thereafter, each specimen was subjected to a three-point bending test at L/D=40 and a crosshead speed of 5 mm/min by using 5 kN Instron Universal Testing Machine to measure the flexural strength and the flexural modulus of elasticity, and the ratio of the flexural modulus of elasticity along each direction was determined as well as the average value and coefficient of variation of each of them were determined.

Example 2

A fiber-reinforced resin material and a fiber-reinforced resin material molding were obtained in the same manner as in Example 1 except that the width of the chopped fiber bundle was changed to 15 mm.

The average value P of fiber content in the fiber-reinforced resin material molding thus obtained was 56.0%, and the coefficient of variation Q in the fiber content was 20.3%.

Comparative Example 1

Product name "STR120N131-KA6N" (manufactured by Mitsubishi Rayon Co., Ltd., degree of roughness β:3.71, and total value of average value and standard deviation of degree of crystal orientation fa of fiber bundle: 0.105) was used as a fiber-reinforced resin material, two pieces of 25 cm square specimens having a thickness of 2 mm were cut out from the fiber-reinforced resin material, and superposed, and subjected to press molding, thereby obtaining a 30 cm square plate-shaped fiber-reinforced resin material molding. The average value P of fiber content in the molding thus obtained was 44.2%, and the coefficient of variation Q was 47.1%.

The evaluation results for the fiber-reinforced resin material molding obtained in Example 1 are presented in Table 1, the evaluation results for the fiber-reinforced resin material molding obtained in Example 2 are presented in Table 2, and the evaluation results for the fiber-reinforced resin material molding obtained in Comparative Example 1 are presented in Table 3, respectively.

TABLE 1

| Example 1 | | | | | |
|---|---|---|---|---|---|
| 0° direction | | | 90° direction | | |
| | Flexural strength (MPa) | Flexural modulus of elasticity (GPa) | | Flexural strength (MPa) | Flexural modulus of elasticity (GPa) |
| 1 | 476 | 44 | 1 | 521 | 40.2 |
| 2 | 421 | 31.8 | 2 | 493 | 37.5 |
| 3 | 578 | 45.4 | 3 | 450 | 38.5 |
| 4 | 525 | 38.1 | 4 | 534 | 37.9 |
| 5 | 549 | 41 | 5 | 436 | 36 |
| 6 | 492 | 45.3 | 6 | 460 | 35.7 |
| Average value | 507 | 40.9 | Average value | 482 | 37.6 |
| Standard deviation | 56 | 4.4 | Standard deviation | 40 | 1.7 |
| Coefficient of variation | 11% | 13% | Coefficient of variation | 8% | 4% |

TABLE 2

Example 2

| | 0° direction | | | 90° direction | |
|---|---|---|---|---|---|
| | Flexural strength (MPa) | Flexural modulus of elasticity (GPa) | | Flexural strength (MPa) | Flexural modulus of elasticity (GPa) |
| 1 | 528 | 41.5 | 1 | 655 | 48 |
| 2 | 491 | 46.3 | 2 | 544 | 41.7 |
| 3 | 572 | 51.6 | 3 | 501 | 38.5 |
| 4 | 642 | 49.4 | 4 | 422 | 37.3 |
| 5 | 588 | 46.3 | 5 | 529 | 41.8 |
| 6 | 663 | 53.9 | 6 | 485 | 37.2 |
| Average value | 581 | 48.2 | Average value | 522 | 40.8 |
| Standard deviation | 65.6 | 4.4 | Standard deviation | 77.5 | 4.1 |
| Coefficient of variation | 11% | 9% | Coefficient of variation | 15% | 10% |

TABLE 3

Comparative Example 1

| | 0° direction | | | 90° direction | |
|---|---|---|---|---|---|
| | Flexural strengh (MPa) | Flexural modulus of elasticity (GPa) | | Flexural strengh (MPa) | Flexural modulus of elasticity (GPa) |
| 1 | 526 | 23.5 | 1 | 324 | 17.1 |
| 2 | 526 | 23.2 | 2 | 350 | 21.1 |
| 3 | 426 | 17.9 | 3 | 461 | 22.2 |
| 4 | 286 | 21.8 | 4 | 500 | 21.7 |
| 5 | 483 | 21.8 | 5 | 447 | 23 |
| 6 | 323 | 18.8 | 6 | 463 | 21.3 |
| Average value | 428 | 21.2 | Average value | 424 | 21.1 |
| Standard deviation | 103.4 | 2.31 | Standard deviation | 70.2 | 2.06 |
| Coefficient of variation | 24% | 11% | Coefficient of variation | 17% | 10% |

In the fiber-reinforced resin material moldings of Examples 1 and 2, the coefficient of variation Q in the fiber content is 40% or less and the fluctuation in the fiber content is suppressed as compared to the fiber-reinforced resin material molding of Comparative Example 1 in which the coefficient of variation Q exceeds 40%, and the fluctuations in physical properties are thus small.

EXPLANATIONS OF LETTERS OR NUMERALS

1 Apparatus for manufacturing fiber-reinforced resin material
10 Opening and dividing unit
11 First carrier sheet supply unit
12 First coating unit
13 Cutting machine
14 Second carrier sheet supply unit
15 Second coating unit
20 First conveyance unit
28 Second conveyance unit
31 Lamination unit
50 Opening unit
52 Dividing unit
100, 200, and 300 Impregnation device
110 First impregnation means
115 Concavo-convex roll
115*a* Roll outer circumferential surface
130 and 130A Convex portion
130*a* and 130*b* Front end face
120, 140, and 150 Second impregnation means

The invention claimed is:

1. A molding material comprising a thermosetting resin and a sheet-shaped carbon fiber bundle group impregnated with the thermosetting resin,
wherein such a molded product that has a coefficient of variation of 40% or less in fiber content per unit zone of 0.1 mm square on a cut face along a thickness direction is obtainable by heating and pressing the molding material using a panel molding die of 300 mm×300 mm×2 mm at 140° C. and 8 MPa for 5 minutes.

2. The molding material according to claim 1, wherein the sheet-shaped carbon fiber bundle group comprises carbon fibers having an average fiber length of from 5 to 100 mm.

3. The molding material according to claim 1, wherein fiber axis directions of carbon fiber bundles are substantially randomly distributed on a cut face along a plane direction in the molded product.

4. The molding material according to claim 1, wherein the coefficient of variation is 10% to 40%.

5. The molding material according to claim 1, wherein the molded product has an average value of fiber content per unit zone of 0.1 mm square on a cut face along a thickness direction of from 50% to 60%.

6. The molding material according to claim 1, wherein a ratio of respective flexural moduluses of elasticity along respective directions of two orthogonal directions in the molded product is from 0.8:1 to 1:0.8 and coefficients of variation in flexural moduluses of elasticity along the respective directions are both from 5 to 15.

7. The molding material according to claim 1, of which a degree of roughness β determined by the following Equations (1) to (3) is from 0.5 to 4.5 when a diffracted X-ray having a diffraction angle 2θ of 25.° is detected by an X-ray diffraction method:

$$\beta = \int_0^{360} |f(\phi)| d\phi \times \frac{1}{360} = \left( \sum_{i=2}^{N} (|f(\phi_i)| + |f(\phi_{i-1})|) \times d\phi \times \frac{1}{2} \right) \times \frac{1}{360} \quad (1)$$

in Equation (1), $f(\phi_i)$ is a brightness which is represented by the following Equation (2) and obtained by subtracting an average brightness from a brightness ($I(\phi_i)$) at an i-th rotation angle ($\phi_i$) in X-ray diffraction measurement and $d\phi$ is a step size in the X-ray diffraction measurement. $I(\phi_i)$ is normalized so that an integrated intensity represented by the following Equation (3) is 10,000, $$f(\phi_i) = I(\phi_i) - \frac{\sum_{i=1}^{N} I(\phi_i)}{N} \quad (2)$$

$$\int_0^{360} I(\phi) d\phi = \sum_{i=2}^{N} (I(\phi_i) + I(\phi_{i-1})) \times d\phi \times \frac{1}{2} = 10000. \quad (3)$$

8. The molding material according to claim 1, of which a total value of an average value and a standard deviation of a degree of crystal orientation fa with a 0° direction as a reference of carbon fiber bundles determined by the following Equation (4) is from 0.05 to 0.13 when diffracted X-ray having a diffraction angle 2θ of 25.4° is detected by an X-ray diffraction measurement where one of two orthogonal directions along a plane direction is set to the 0° direction and the other direction is set to a 90° direction:

$$f_a = 2a - 1 \quad (4)$$

$$a = \frac{\sum_{i=1}^{N} I(\phi_i) \cos^2 \phi_i}{\sum_{i=1}^{N} I(\phi_i)} \quad (5)$$

-continued $$\int_0^{360} I(\phi) d\phi = \sum_{i=2}^{N} (I(\phi_i) + I(\phi_{i-1})) \times d\phi \times \frac{1}{2} = 10000 \quad (6)$$

in Equation (4), a is a coefficient of orientation represented by Equation (5) and $I(\phi_i)$ is a brightness at an i-th rotation angle ($\phi_i$) in the X-ray diffraction measurement and is normalized so that an integrated intensity represented by Equation (6) above is 10,000.

9. A manufacturing method of the molding material according to claim 1, the method comprising:
coating a first sheet with a first paste comprising a thermosetting resin;
coating a second sheet with a second paste comprising the same thermosetting resin;
cutting a carbon fiber bundle with a cutting machine such that the resultant cut fiber bundles are scattered on the first sheet to form a sheet-shaped carbon fiber bundle group;
forming a laminate in which the sheet-shaped fiber bundle group is sandwiched together with the first paste and the second paste between the first sheet and the second sheet; and
pressing the laminate for impregnating the sheet-shaped fiber bundle group with the thermosetting resin,
wherein the first sheet and the second sheet are conveyed at a line speed of from 0.5 to 5 m/min;
a comb comprising a plurality of inclined rods arranged side by side and parallel to a conveying direction of the first sheet is disposed between the first sheet and the cutting machine; and
the laminate is pressed with a concavo-convex roll having a roll outer circumferential surface provided with a plurality of convex portions each having a planar end face in the pressing.

10. The manufacturing method according to claim 9, wherein, in the pressing, the laminate is pressed with a planar roll after being pressed with the concavo-convex roll.

11. A manufacturing method of a molded product, wherein the molding material according to claim 1 is heated and pressed by using a die corresponding to a shape of an intended molded product.

* * * * *